United States Patent
Pretorius

(10) Patent No.: US 9,816,492 B2
(45) Date of Patent: Nov. 14, 2017

(54) SHAPE MEMORY ALLOY RADIATION POWER HARVESTER

(76) Inventor: Jacob Van Reenen Pretorius, Somerville, MA (US)

( * ) Notice: Subject to any disclaimer, the term of this patent is extended or adjusted under 35 U.S.C. 154(b) by 577 days.

(21) Appl. No.: 13/058,490

(22) PCT Filed: Aug. 11, 2009

(86) PCT No.: PCT/US2009/053377
§ 371 (c)(1),
(2), (4) Date: Apr. 13, 2011

(87) PCT Pub. No.: WO2010/019554
PCT Pub. Date: Feb. 18, 2010

(65) Prior Publication Data
US 2011/0179790 A1    Jul. 28, 2011

Related U.S. Application Data

(60) Provisional application No. 61/188,488, filed on Aug. 11, 2008.

(51) Int. Cl.
*F03G 6/06*    (2006.01)
*F03G 7/06*    (2006.01)

(52) U.S. Cl.
CPC ............. *F03G 7/065* (2013.01); *Y02E 10/46* (2013.01)

(58) Field of Classification Search
CPC ..... F03G 6/00; F03G 6/06; F03G 7/06; F03G 7/065; F03G 2006/061; F03G 2006/062; Y02E 10/46; C22F 1/006; C22F 1/08; C22F 1/10

USPC ........... 60/527–529, 616–620, 641.8, 641.1, 60/641.15, 641.13
See application file for complete search history.

(56) References Cited

U.S. PATENT DOCUMENTS

| | | | | |
|---|---|---|---|---|
| 3,830,060 A * | 8/1974 | Jedlicka et al. | ................. | 60/527 |
| 3,989,417 A * | 11/1976 | Neidigh | ........................ | 417/379 |
| 4,006,594 A * | 2/1977 | Horton | ............................ | 60/527 |
| 4,075,847 A * | 2/1978 | Ray | ................................ | 60/527 |
| 4,281,513 A * | 8/1981 | Johnson et al. | ................ | 60/527 |
| 4,307,571 A * | 12/1981 | Jackson | ..................... | 60/641.15 |
| 4,327,552 A * | 5/1982 | Dukess | ........................... | 60/527 |
| 4,498,456 A * | 2/1985 | Hashizume | ................... | 126/581 |
| 4,598,550 A * | 7/1986 | Abbott | .......................... | 60/641.8 |
| 4,938,026 A * | 7/1990 | Goldstein | .............. | F03G 7/065 60/527 |
| 5,079,920 A * | 1/1992 | Whitehead | ............. | F03G 7/065 60/527 |
| 6,659,744 B1 * | 12/2003 | Raymond, Jr. | ................. | 418/18 |
| 6,663,351 B2 * | 12/2003 | Joo | .................. | 417/53 |
| 2002/0046565 A1 * | 4/2002 | Singh | ............................ | 60/527 |

(Continued)

FOREIGN PATENT DOCUMENTS

| | | |
|---|---|---|
| DE | 102 10 954 A1 | 7/2003 |
| FR | 2 789 734 A1 | 8/2000 |

*Primary Examiner* — Mark Laurenzi
*Assistant Examiner* — Mickey France
(74) *Attorney, Agent, or Firm* — Loginov & Associates; William A. Loginov

(57) ABSTRACT

A system and method for converting solar energy into mechanical and electrical energy is described. This method is based on the phase change of a material due to temperature. The change of phase is accompanied with displacement at high forces that can easily be converted into useful mechanical and electrical power.

20 Claims, 19 Drawing Sheets

(56) References Cited

U.S. PATENT DOCUMENTS

| | | |
|---|---|---|
| 2003/0226359 A1 | 12/2003 | Letovsky |
| 2004/0035107 A1* | 2/2004 | Letovsky .................. 60/527 |
| 2005/0178120 A1 | 8/2005 | Kutlucinar |
| 2006/0162331 A1 | 7/2006 | Kirkpatrick et al. |
| 2006/0260534 A1* | 11/2006 | Petrakis .................. 116/216 |
| 2008/0056920 A1* | 3/2008 | Griffiths et al. ............ 417/505 |
| 2008/0227060 A1* | 9/2008 | Esashi et al. ................ 434/113 |
| 2009/0072575 A1* | 3/2009 | Browne et al. ............. 296/97.7 |
| 2009/0241537 A1* | 10/2009 | Browne et al. ................ 60/527 |
| 2011/0179790 A1* | 7/2011 | Pretorius ................. 60/641.15 |

* cited by examiner

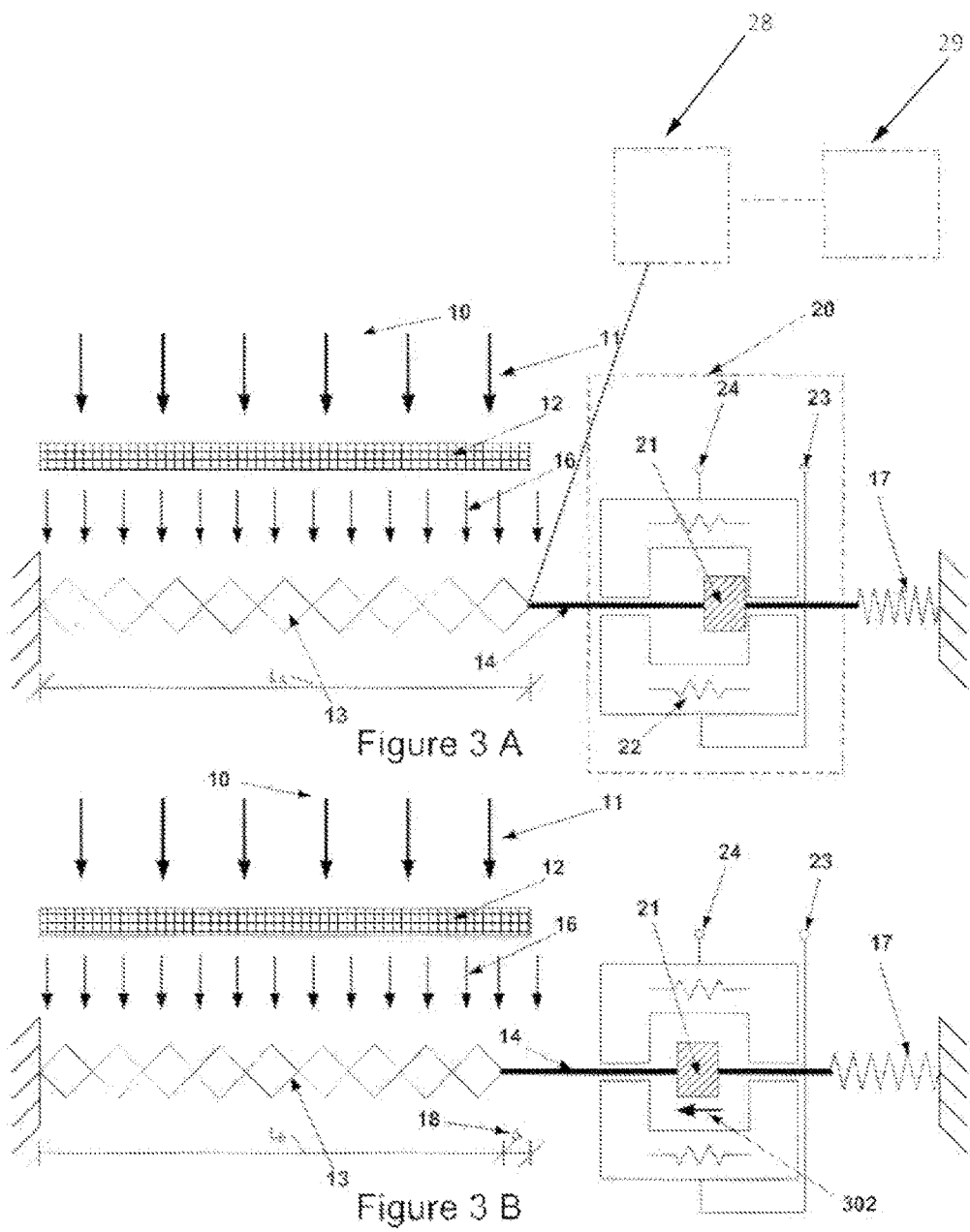

SHAPE MEMORY ALLOY RADIATION POWER HARVESTER

RELATED APPLICATIONS

This application is a United States National Phase Application filed under 35 U.S.C. 371 based upon Patent Cooperation Treaty Application No. PCT/US/2009/053377, filed Aug. 11, 2009 and entitled SHAPE MEMORY ALLOY RADIATION POWER HARVESTER, which claims priority of U.S. Provisional Application Ser. No. 61/188,488, filed Aug. 11, 2008, entitled SHAPE MEMORY ALLOY RADIATION POWER HARVESTER, the teachings of which applications is expressly incorporated herein by reference.

FIELD OF THE INVENTION

This invention relates to harvesting radiation energy and specifically the sun's energy with and to applications using Shape Memory Alloys (SMA) to store and convert energy.

BACKGROUND OF THE INVENTION

As mankind continues to develop around the world, the demand for energy rises. Most energy used to power machines and generate electricity is derived from fossil fuels, such as coal, natural gas or oil. These supplies are limited, and the burning of such fuels may causes atmospheric pollution and also leads to the production of Carbon Dioxide, which is suspected to accelerate the greenhouse effect and lead to global warming. Some alternate approaches to produce energy include the harnessing of nuclear energy, wind, moving water (hydro power), geothermal energy or solar energy. However, each of these alternate energy approaches has drawbacks. Nuclear power requires a huge capital investment, while safety and waste disposal are concerns. Wind power is effective, but the turbines employed to harness it require a windy site, and takes up large footprints of land. Hydro power requires the construction of large, potentially environmentally harmful dams and, more importantly, large volumes of flowing water. Geothermal, likewise, requires a source of such energy that is relatively near the surface—a characteristic not common to a large portion of the Earth—and has the potential to disrupt the balance of forces that exist inside the Earth's crust. Solar, the cleanest, and most available form of energy requires a relatively sunny locale (common in many places, particularly remote deserts), but the generation of electricity from solar energy is relatively inefficient. Expensive photovoltaic cells must be deployed in large arrays to generate a meaningful quantity of electricity. Systems that use concentrating mirrors to generate steam are also inefficient, and require large footprints to deploy an array of focusing mirrors. These facilities are unsuitable for smaller generation systems.

Particularly in the developing world, and anywhere that is too remote to receive power transmission, power to run pumps, lights and essential services must be derived from smaller scale generators. Solar is not always suitable for this task, due to the size and expense of the required photovoltaic array. Instead it is highly desirable to provide a more efficient and compact system for generating predetermined quantities of electricity, or to perform direct mechanical work (such as to drive a reciprocating pump). This system should be scalable to achieve a desired level of energy output.

SUMMARY OF THE INVENTION

The invention overcomes disadvantages of prior systems by harvesting radiation energy and specifically the sun's energy with the use of Shape Memory Alloys (SMA) and converting that energy to a form that can be readily used by mankind.

SMA exhibits unique characteristics during phase change from Martensite to Austenite. In the cold Martensite phase the metal is soft and malleable, allowing it to be strained by more than 5%. When the SMA is heated past its transformation temperature, it changes phase to Austenite. In the Austenite phase the SMA is a hard and stiff. Thus, the phase transition form Martensite to Austenite is associated with a large strain recovery. If this strain recovery is apposed by a mechanism, the SMA will exert a substantial amount of force on such a mechanism, transferring energy. When the SMA is allowed to cool down, it will transition back to Martensite and it will be possible to re-strain the metal. Heating the SMA will repeat the cycle.

If the SMA is placed in direct exposure of a heat source like the sun, it will be heated through radiation past its transition temperature and change phase. The energy that is generated by the SMA can be transformed into a number of useful mechanisms and devices or stored for later use.

In one embodiment of the invention, the SMA is a wire or a ribbon that is attached to a spring and a magnet. During the phase transition form Martensite to Austenite, the SMA will pull a magnet through a coil, thereby generating electrical energy. This electricity can then be converted and stored in a battery to power electric devices. When the sun's radiation is removed from the SMA, within the appropriate environmental conditions, the SMA will cool down and return to the Martensite phase. During the phase change, the spring will re-strain the wire while pulling the magnet through the coil, generating more electricity. Once the phase change is complete, the SMA can be exposed to the sun again to repeat the process and provide continuous energy.

In other embodiment of the invention, the wire or ribbon will drive a linear piston pump that lifts fluid from one height to another, inducing flow.

In yet another embodiment of the invention, the linear reciprocal motion of the device can be coupled to a crankshaft to create rotary motion. This motion can then be used for air compression, electricity generation, air-conditioning, fluid pumping or propulsion, to name a few. Such a rotary generator can also be coupled to an electric generator that powers any of the previously mentioned devices to establish a hybrid solar drive system that can operate on electricity during periods of low sunlight.

BRIEF DESCRIPTION OF THE DRAWINGS

This invention description below refers to the accompanying drawings, of which.

DETAILED DESCRIPTION

Shape memory alloys (SMAs) are metal alloy materials that have the ability to return to their original "memorized" shape after being deformed. All SMAs have two distinct crystal structures, or phases, with the phase present being dependent on the temperature and the amount of stress applied to the SMA. The two phases are Martensite, which exists at lower temperatures, and Austenite, which exists at higher temperatures. The exact structure of these two phases depends on the type of SMA. The most commonly used type of SMA is called Nitinol. Nitinol is a mixture of two component metals, nickel (Ni) and titanium (Ti), which are mixed in an approximate ratio of 55% by weight Ni and 45% by weight Ti with various other metals such as Copper introduced at quantities less than 2% to obtain specific properties such as increased fatigue life, lower hysteresis and other qualities as will be know to those skilled in the art. The mixing ratio determines the transition temperatures of the specific alloy. The mixture is annealed to form a part in the desired shape.

Shape memory alloys possess two material properties that work together to provide shape memory. The first material property is an Austenite to Martensite transition in the SMA. This is a solid-to-solid phase transition from an Austenite phase with high symmetry (such as a cubic molecular structure) to a Martensite phase with lower symmetry (such as tetragonal or monoclinic structures). The second property of a shape memory alloy is the ability of the low-symmetry Martensite structure to be deformed by twin boundary motion. A twin boundary is a plane of mirror symmetry in the material. If the twin boundary is mobile, as in certain Martensite structures, the motion of the boundary can cause the crystal to rearrange and thus accommodate strain.

Figure 1:
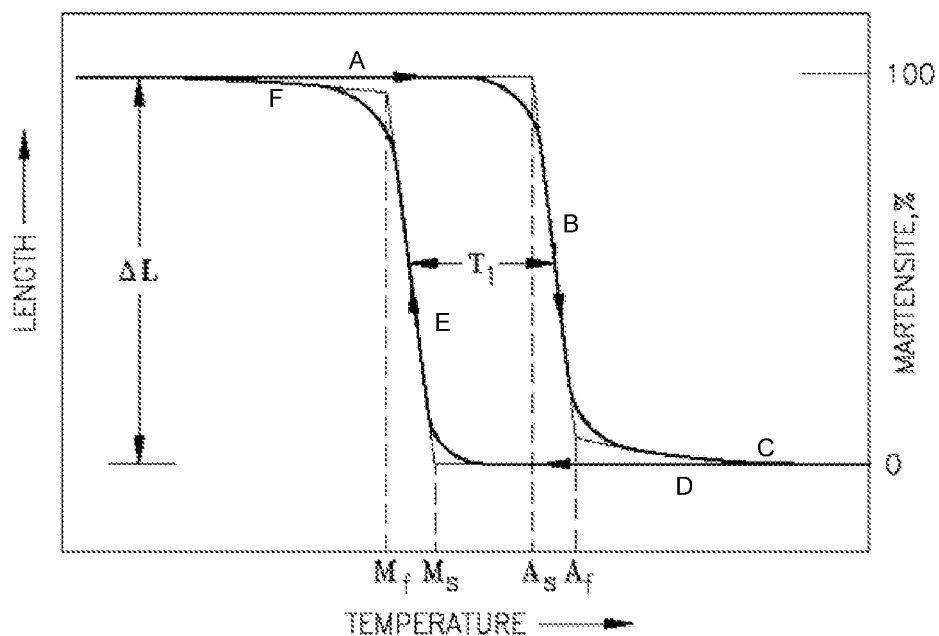
FIG. 1 is a graph that illustrates the different transition temperatures of a typical SMA and their influence on the length of a SMA wire.
Figure 2:
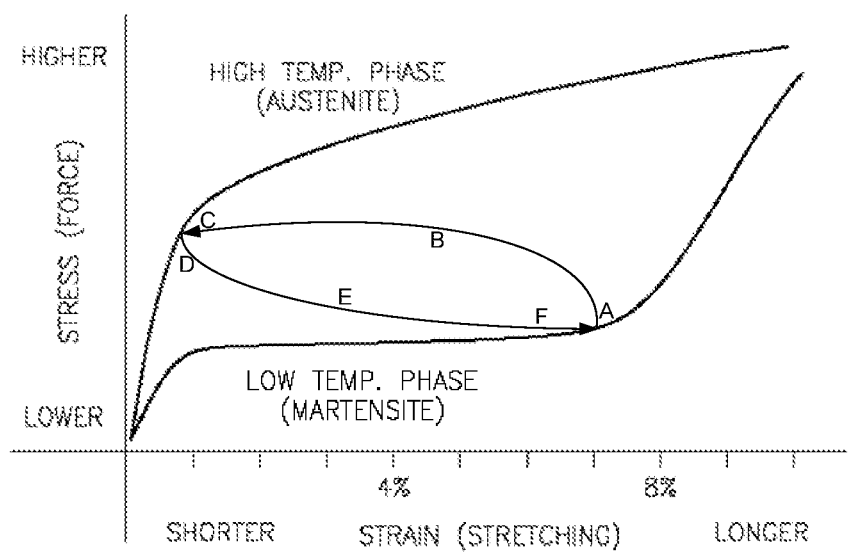
FIG. 2 is a graph that illustrates the stress-strain curve of a typical SMA.
Figure 3:
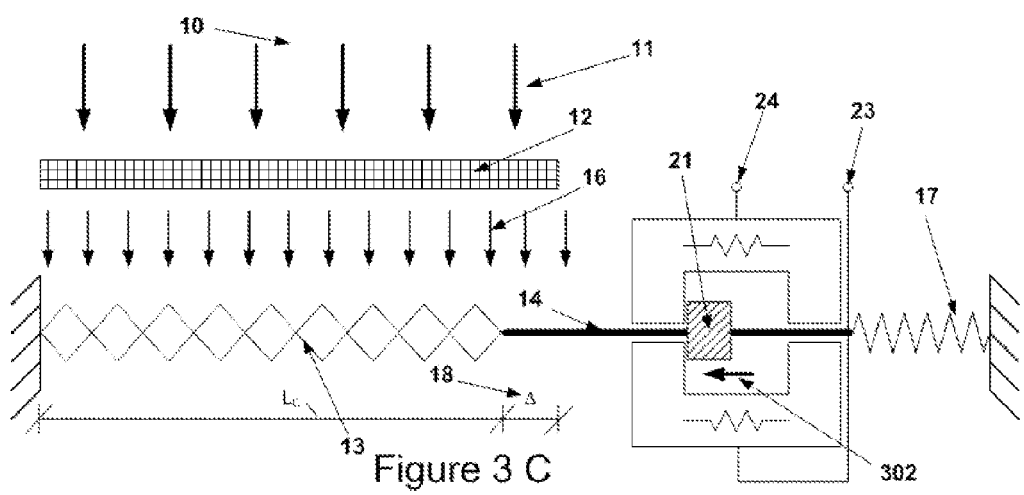
FIG. 3A is a schematic view of an energy harvesting system in an original position according to an illustrative embodiment of this invention.
FIG. 3B is a schematic view of the energy harvesting system undergoing a phase change from the original position to a standstill phase, according to the illustrative embodiment of FIG. 3.
FIG. 3C is a schematic view of the energy harvesting system in a standstill phase, according to the illustrative embodiment of FIG. 3A.
FIG. 3D is a schematic view of the energy harvesting system in a standstill phase, including a shading system, according to the illustrative embodiment of FIG. 3A.
FIG. 3E is a schematic view of the energy harvesting system undergoing a phase change from the standstill phase to the original position, according to the illustrative embodiment of FIG. 3.
FIG. 3F is a schematic view of the energy harvesting system that has returned to the original position, according to the illustrative embodiment of FIG. 3A.
Figure 3:
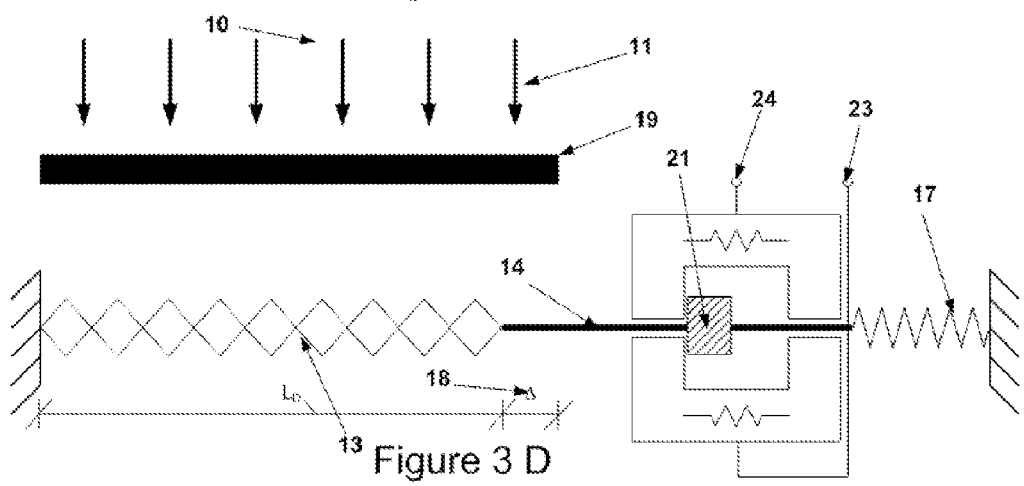
Figure 3:
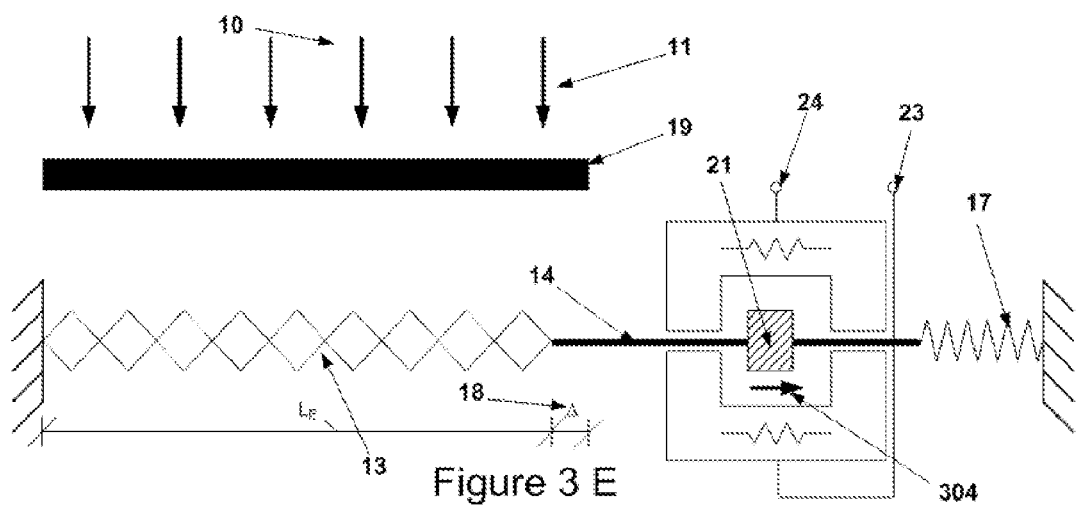
Figure 3:
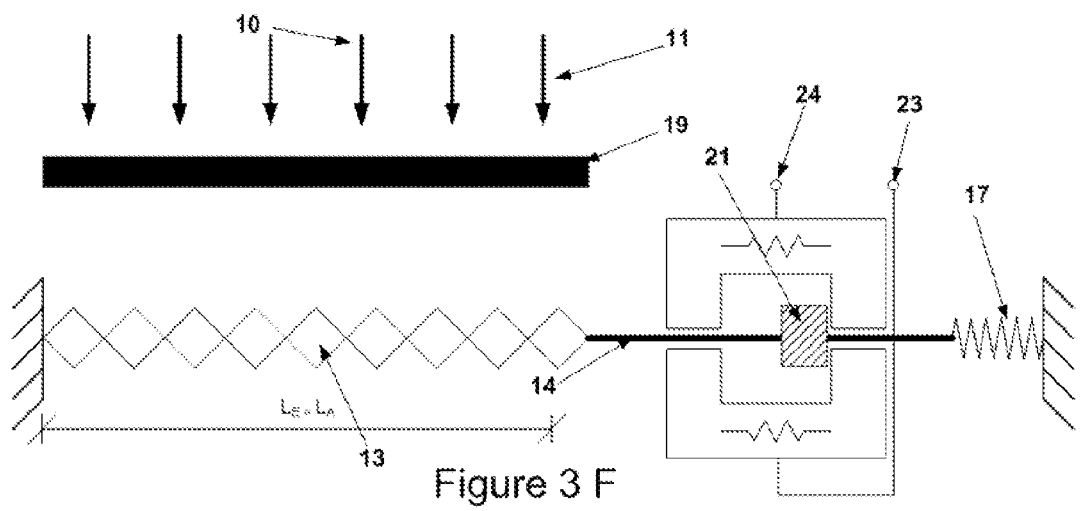

Thermal activation implies that heat is transferred to the material for actuation. This is indeed the case, as shown in FIG. 2. In the lower temperature, Martensite phase, the material can easily be strained as shown in FIG. 1. By heating the material, phase transformation to Austenite starts at the Austenite start temperature ($A_s$ in FIG. 2). Raising the temperature of the material further induces more Austenite to form. The temperature at which the entire material has been transformed to Austenite is referred to as the Austenite finish temperature ($A_f$ in FIG. 2). During the transition to Austenite, the shape of the material reverts to its set, memory shape. This is usually accompanied by large amounts of force. The SMA is able to do significant work to accomplish its shape recovery. Once heated past the Austenite finish temperature, the material remains in this Austenite state at all temperatures above the Martensite start temperature ($M_s$ in FIG. 2).

By lowering the temperature of the material to below $M_s$, the phase of the material is transformed to Martensite. As in the case of heating to induce Austenite, dropping the temperature below the $M_s$ temperature forms Martensite. This continues until the temperature is below the Martensite finish temperature, below which all the material is in the Martensite state. In this state, the material is once again ductile and can easily be deformed. Once again, the SMA will remain in Martensite phase after being cooled below $M_f$ until the temperature is raised to above the As temperature.

The temperature difference between the $M_s$ and the $A_s$ is referred to as the hysteresis of the material. SMAs exhibit a controllable hysteresis profile as shown in FIG. 2. The temperature gap between the Austenite start and Martensite start temperature can be as low as 10° C. or as high as 100° C.

For the purpose of radiation energy harvesting, two properties of SMA's are attractive namely their ability to be easily deformed in the low temperature Martensite phase and their ability to recover that strain with high force when transitioning to the Austenite phase. Also, the temperature hysteresis of the material is important in that a smaller hysteresis will allow for faster cycling speeds and thus higher power output. As generally defined herein, "radiation" defines one or more bands frequency bands (wavelengths) of electromagnetic energy capable of being directed to, and causing, a desired phase change in the SMA according to the various embodiments herein. This electromagnetic energy is typically comprised of, but not limited to, solar energy in the visible and infrared bands. However, other forms of electromagnetic energy can be employed. In addition, in certain embodiments, the energy can be delivered a working fluid such as forced air or another heated gas. Thus, as used herein, the term solar should be taken broadly to include radiation sources that effect phase change in the SMA.

FIGS. 3A-F illustrate one embodiment of the invention. In this particular embodiment, the energy harvesting system consists of an actuation and an energy conversion system. These are two separate systems and the actuation system can be used with many other conversion systems to accomplish the goal of delivering energy in a form that is useful and readily available. The conversion system described below is one of many and was chosen purely because of its simplicity and aiding in teaching those skilled in the art to the workings of SMA energy harvesting system.

The actuation system 10 contains a focal lens 12, a wire or ribbon of SMA 13 and a recovery spring 17, or any other appropriate restorative force device. The SMA can take on a variety of forms. In general, the forms should allow for sufficient extension and contraction based upon expected degree of phase change. As shown, the form is generally a wire that can have a variety of cross-sectional shapes that will enhance the amount of surface area that is exposed to heating and cooling. Furthermore, the SMA can be arranged as a plurality of wires that are connected in parallel to increase the amount of force that the power harvester delivers, or in series, to increase the stroke of the device. However, the specific geometry of the expanding and contracting SMA is highly variable and can be adapted to the force and size constraints of the underlying system. The energy conversion system 20, also termed herein a "linear reciprocal device" 20 based on the linear motion and reciprocal action discussed herein and above, in this specific case consists of a permanent magnet 21 and a conductive wire wound coil 22 that has two terminations 23 and 24 respectively. The SMA wire 13, the permanent magnet 21 and the spring are all fixed to each other via a mechanical stiff link 14 so that they all get displaced by the same exact amount and all forces are transmitted to every member. The mechanical stiff link can also take on a variety of forms, including any sturdy polymer, metal, or any other appropriate material that allows for correct displacement of the interconnected parts.

Figure 4:
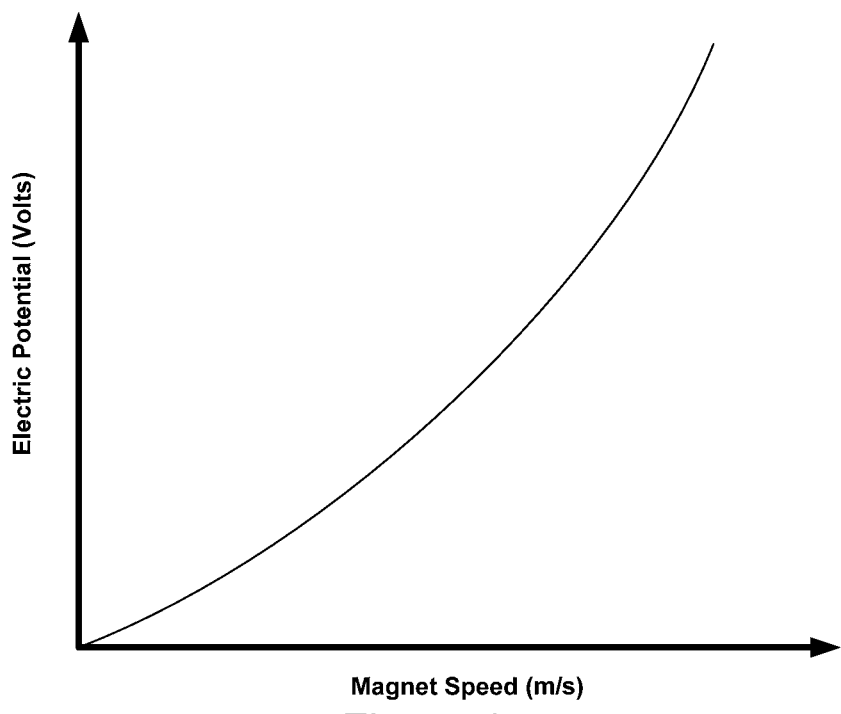
FIG. 4 is a graph that shows the relationship between magnet speed and induced voltage for a linear electromagnetic electric generator.

In FIG. 3A, the SMA is cooled down and in the Martensite phase. The recovery spring 17 ensures that when the SMA is in Martensite, it is strained and extended to its original length $L_A$. This state corresponds to A in FIGS. 1 and 2. When the focal lens 12 is exposed to radiation, in this specific case solar rays 11, it will focus the sun's energy 16 onto the SMA 13. The addition of energy to the SMA wire 13 increases its temperature, past the $A_s$ temperature (FIG. 2) and it starts to transform to Austenite. This phase transition will induce strain recovery 18 in the SMA 13 as shown in FIGS. 1 and 2 and result in a reduction of length in the SMA, shown as $L_B$. The strain recovery will accelerate the permanent magnet 21 so that it will start to move 18 in a direction 302 inside the coil 22. As the magnet moves, it generates an electric potential across the terminals of the coil 23 and 24. The movement will also extend the recovery spring 17. This electric potential as a function of magnet speed is shown in FIG. 4. The electric potential can be coupled to an external mechanism that can utilize the electrical energy directly or store it for later use. It is contemplated that the electric potential generated by the various embodiments herein can be interconnected with any number of electrical devices that are capable of using one or more sources of electricity.

As the solar energy 16 continues to heat the SMA 13, it will transform more into Austenite (point B in FIGS. 1 and 2), and accelerate the permanent magnet 21 further down the coil 22 in a direction 302. This will increase the electric potential over 23 and 24 as shown in FIGS. 3B and 4. At this point the magnet is inducing maximum electrical energy in the coil. This energy conversion will continue until all of the SMA 13 is transformed into Austenite when the SMA temperature is higher than $A_f$ (Point C FIGS. 1 and 2). At this point the strain recovery will end, the forces on the magnet 21 will dissipate, the SMA length will be $L_C$, and the system will come to a standstill, as illustrated in FIG. 3C, reducing the electrical energy to zero (FIG. 4).

Some of the mechanical energy generated by the SMA will be used to drive a shading system 19, FIG. 3D, to block the radiation from the sun and enable the SMA to cool down and transform back into Martensite. This shading system 19 will use a mechanism that, just as the SMA 13 comes to the end of its translation, shown as length $L_D$, will prevent the solar rays from reaching the SMA 13. There are many ways to implement the shading mechanism and these will be discussed in more detail.

Once the solar radiation is removed from the SMA 13, the material will start to lose heat to the atmosphere through convection and radiation form the SMA 13 to the atmosphere. As the SMA 13 cools down, it will reach its $M_s$ temperature and the transitioning from Austenite to Martensite will commence (D in FIGS. 1 and 2), resulting in an increasing length $L_E$.

Because the recovery spring 17 is extended, it is exerting a force on the SMA 13 such that when the SMA 13 starts to become softer, it will be strained. This translation will force the permanent magnet 21 back through the coil (FIG. 3E) in a direction of vector component 304 and generate electric potential energy over poles 23 and 24. The magnitude of this potential energy will depend on the speed of the transition and its polarity will be opposite to when the SMA 13 was heating up.

The SMA 13 will continue to cool down until it reaches $M_f$ temperature and is completely transformed to Martensite (F in FIGS. 1 and 2). At this stage the spring will have pulled the system back to its original position as shown in FIG. 3F. At this point, the length of the SMA will increase to an original length $L_F$, which is equivalent to the length $L_A$ of FIG. 3A. Again, just before the final position is reached, the shading system 18 will be engaged and will expose the focal lens 12 to the sun, returning the system to the state of FIG. 3A and re-starting the entire sequence described in FIG. 3A.

Figure 5:
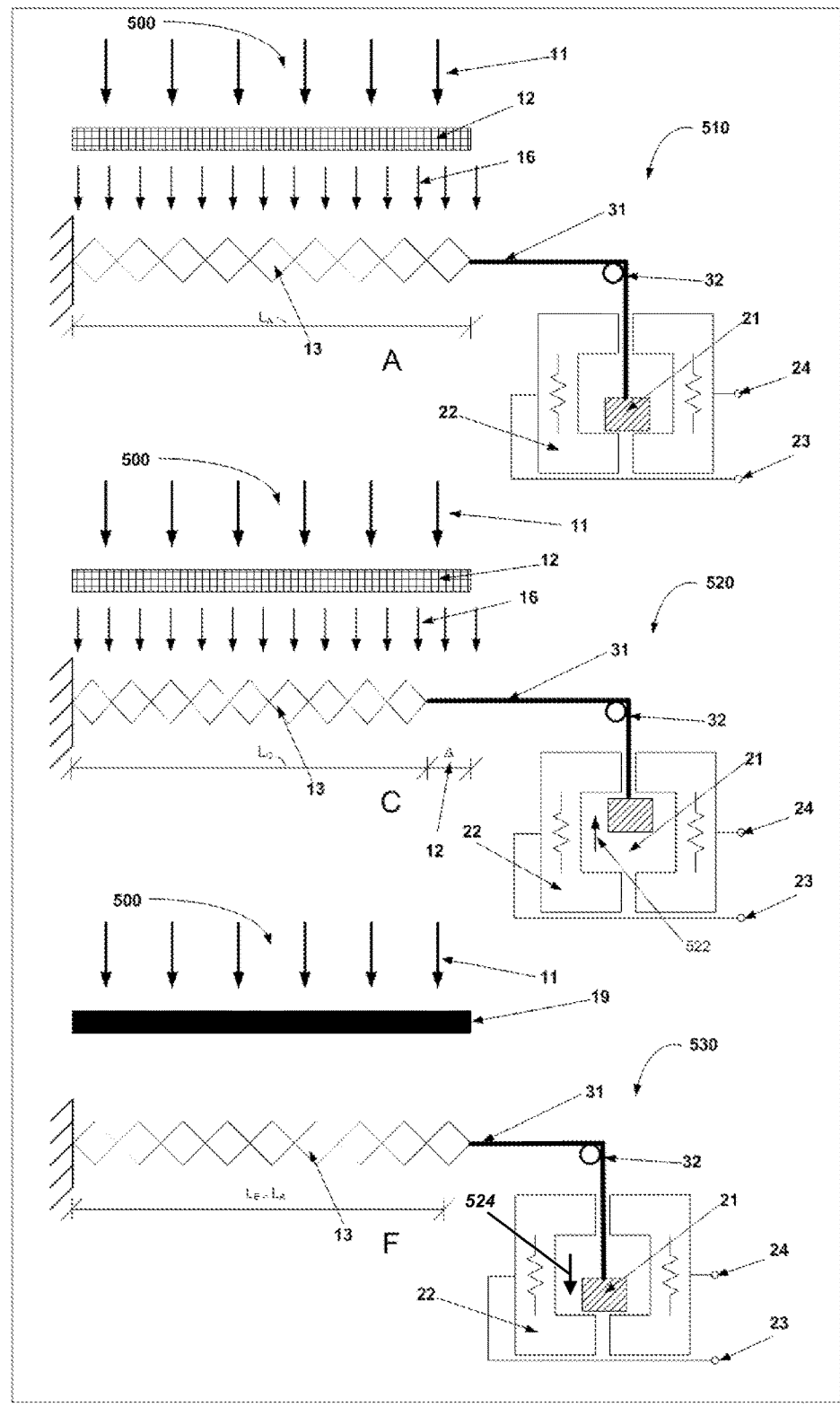
FIG. 5 is a schematic view of an energy harvesting system showing the various transition phrases, according to another illustrative embodiment.

FIG. 5 is an illustration of another illustrative embodiment of the invention. Instead of having a spring 17 as a resetting mechanism for the SMA, gravity is used. For the purposes of this description, like reference numbers shall refer to like elements and/or those functioning similarly to those in previously described embodiments. In this embodiment, the magnet 21 is coupled to the SMA 13 via a flexible link 31 such as a cable or any other interconnecting component that enables a force in one direction to be redirected into a second direction, such as those including a component of gravity. This flexible link is wrapped around a wheel 32 that is free to rotate as the link 31 translates. This setup allows the magnet 21 to hang from the wheel inside the coil 22. The magnet 21 has sufficient weight that it will strain the SMA 13 when its temperature is below $M_f$ at stage of the cycle 510.

When the SMA is exposed to solar radiation 16 it will heat up and reach $A_s$, as shown at stage of the cycle 520. At temperatures above $A_s$, the SMA will start to transform into Austenite and contract. This contraction will overcome gravity and accelerate the magnet in a direction 522, increasing its speed and inducing a voltage across poles 23 and 24 as in FIG. 3B. As long as the SMA 13 is exposed to the solar heating 16, the phase transformation will continue until $A_f$ is reached (FIG. 6C). At this point, as in FIG. 3D, the shading mechanism 19 will again block the solar radiation, allowing the SMA 13 to cool down and reach $M_s$. When the SMA 13 is cooled down, the weight of the magnet 21, which is sufficient to strain the SMA 13 under gravity, will accelerate the magnet 21 downward in a direction 524. Again, this will increase the speed of magnet 21 and induce a voltage over poles 23 and 24. The SMA will continue to translate downward, extending the SMA 13, until $M_f$ is reached. At this point, at stage of the cycle 530, the system will come to a standstill, the voltage over the poles will disappear and the shading mechanism will be removed. Solar radiation 16 will again heat up the SMA 13 and the cycle will repeat itself.

As an example of another illustrative embodiment of the invention, the SMA actuator is coupled to a pump that can extract or displace fluids at a certain flow rate. The extracted or displaced fluids can be any type of fluids of an appropriate compressibility factor, such as water, oil, or gasoline. In one specific embodiment of the invention the energy conversion system 600 is a well water cylinder pump as shown in FIG. 6A. This pump consists of a connector 14, pulleys 17, drop pipe 43, spout 41, sucker rod 44, top one-way valve called the plunger 49, bottom check valve 56 and a strainer 57. Plunger and check valves have balls 46 and 54, flow channels 50 and 55 and valve bodies 45 and 53 respectively. These valves are watertight when the balls are seated inside the bodies and allow for water to flow through the flow channels and the bodies when the balls are lifted from the bodies.

Ground water 52 is contained in an aquifer bounded by ground top and bottom ground layers 47 and 58. In FIG. 6A a break 42 is used to indicate that there is a significant length of drop pipe 43 and sucker rod 44 that is duplicated between the break, but not illustrated due to space and clarity constraints. The height difference between the pump level 40 and the water table 48 of the aquifer is the height or head that the pump must overcome for operation; this height difference includes the distance of the break 42.

In FIG. 6A, the SMA is cooled down and in the Martensite phase. The weight of the sucker rod 44 and the plunger 49 ensures that when the SMA is in Martensite, it is strained and extended to its original length $L_G$. This state corresponds to A in FIG. 1 and FIG. 2. When focal lens 12 is exposed to solar rays 11, it focuses the sun's energy 16 onto the SMA 13. The addition of radiant energy to SMA wire 13 increases its temperature, past the $A_s$ temperature (FIG. 2) and it starts to transform to Austenite. These phase transitions will induce strain recovery 18, as shown in FIG. 6B and indicated by the reduced SMA length $L_H$, in the SMA 13 as shown in FIG. 1 and FIG. 2. The strain recovery 18 is translated by connector 14 though pulley system 17 and will accelerate the sucker rod 44 and plunger 49 so that it will start to move upward in direction 601 inside the drop pipe 43. The weight of the water column above the plunger ensures that ball 46 is forced onto the plunger body 49, ensuring a watertight seal. The movement will also generate a drop in pressure in the pump cavity 63 (FIG. 6B), causing ball 45 of check valve 56 to lift off its body 55.

As the solar energy 16 continues to heat the SMA 13, it will transform more into Austenite (point B in FIG. 1 and FIG. 2), and accelerate sucker rod 44 further up drop pipe 43. By this time the drop in pressure in the pump cavity 63 is sufficient to lift check valve ball 54 to open gap 64 (FIG. 6B) and allow for water to flow 65 through the valve body 53 into the cavity 63. This flow originates in the well 52, gets filtered through strainer 57 and flows though flow channel 55 into valve body 45. The flow is shown as 66 and 67 in FIG. 6B. At the top of the drop pipe 43, the water level 40 rises with the plunger 49 until it gets discharged through the spout 41. This discharge will continue as long as the plunger 49 is moving in direction 601 and there is a pressure differential between the top of the drop pipe 43 and the spout 41. The water that is delivered from the spout 41 can be used directly, can be filtered and sanitized for drinking or be stored in a tank for later use, to name a few options.

As long as the concentrated sunlight acts on it, the SMA will continue to heat up until all of the SMA 13 is transformed into Austenite when the SMA temperature is higher than $A_f$ (Point C FIG. 1 and FIG. 2). At this point the strain recovery will end, the SMA will reduce to length $L_J$, the forces on the sucker rod 44 and plunger 49 will dissipate and the system will come to a standstill, as illustrated in FIG. 6C. At this point ball 54 on the check valve 56 will return to the body 53 and the flow though the valve will stop. Simultaneously, spout 41 will discharge the last bit of water under pressure in drop pipe 43 until water level 40 returns to below the entrance of the spout.

At this point, as shown in FIG. 6D, the shading mechanism 19 is activated to remove the solar radiation from the SMA 13 of length $L_J$ and allow the material to lose heat through radiation, convection and conduction. As the SMA 13 cools down, it will reach its $M_s$ temperature and the transitioning from Austenite to Martensite will commence (D in FIG. 1 and FIG. 2).

Because of the weight of the plunger 49 and the sucker rod 44, a force is exerted on the SMA 13 such that when the SMA 13 starts to become softer, it will be strained and extended to length $L_K$. This translation will force the plunger 49 down drop pipe 43 (FIG. 6E) in a direction 602 and create a pressure differential between the top of the plunger 49 and cavity 63. The pressure differential will force ball 46 off the plunger body 45 allowing for water to flow though its flow channel 50 and its body 45. These flows are marked 93 for inlet and 92 for outlet in FIG. 6E respectively. The flow allows for water to be displaced from cavity 63 to above the plunger ready to be displaced upward in the next stroke. At the same time the pressure increase in cavity 63 forces ball 54 onto bottom check valve 56 to ensure a watertight seal.

SMA 13 will continue to cool down until it reaches Mf temperature and is completely transformed to Martensite (F in FIG. 1 and FIG. 2). At this stage the weight of plunger 49 and sucker rod 44 will have moved the system back to its original position as shown in FIG. 6A. At this point, the SMA length is extended to $L_J$, which is equivalent to the original length $L_G$. Again, just before the final position is reached, shading mechanism 19 disengages and exposes focal lens 12 to the sun rays 11, returning the system to the state of FIG. 6A and re-initiating the entire sequence described in above and illustrated in FIG. 3.

A further example of useful work that can be performed by the linear reciprocal motion of the SMA as it changes phase is the compression of gas. An example of such a mechanism is described by Aikman in U.S. Pat. No. 1,998, 264. These linear compressors are widely used for applications such as air-conditioners as described as an example by Kwang Ha Seo in U.S. Pat. No. 6,089,836. For example, the illustration in FIG. 3A indicates that a linear compressor 28 can be operatively connected to the drive member. FIG. 3A also indicates that the linear compressor 28 can be operatively connected to an air-conditioner 29.

As shown in the previous three examples, the basic actuation system can be coupled to a number of alternative power conversion systems. For instance, the translation of the wire's end can be coupled to a crankshaft and the motion turned into rotation that can be stored in a flywheel. Such linear to rotating mechanisms utilizing SMA are illustrated by Wechsler et al, Banks and Johnson in U.S. Pat. Nos. 5,279,123, 3,913,326 and 4,055,955, by way of example. Alternatively the rotation can be coupled to a rotating electromechanical alternator to generate electricity. The linear motion can also be used to compress a gas, to be released later for driving an engine. The actuation system can also be used to directly drive machinery such as air conditioners, pumps, transportation devices, and the like. Alternatively, the mechanical energy from the wire can be used to induce vibrations in a piezoelectric device that will generate electrical power from mechanical power.

Figure 6:
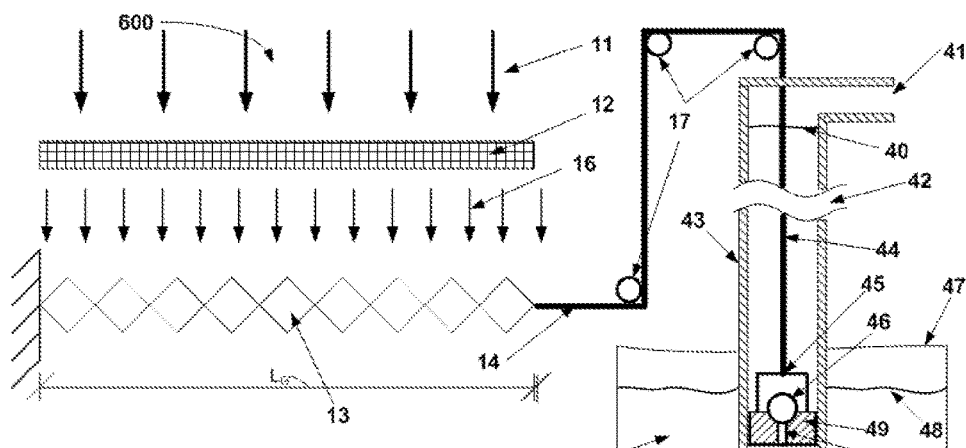
FIG. 6A is a schematic view of an energy harvesting system, shown in an original position, including a solar-powered fluid pump, according to another illustrative embodiment.
FIG. 6B is a schematic view of the energy harvesting system, shown in a transitional phase between the original position and a standstill position, including a solar-powered fluid pump, according to the illustrative embodiment of FIG. 6A.
FIG. 6C is a schematic view of the energy harvesting system, shown in the standstill position, including a solar-powered fluid pump, according to the illustrative embodiment of FIG. 6A.
FIG. 6D is a schematic view of the energy harvesting system, shown in the standstill position, including a solar-powered fluid pump and a shading system, according to the illustrative embodiment of FIG. 6A.
FIG. 6E is a schematic view of the energy harvesting system, shown in a transitional phase between the standstill position and the original position, including a solar-powered fluid pump, according to the illustrative embodiment of FIG. 6A.
FIG. 6F is a schematic view of the energy harvesting system, shown returning to the original position, including a solar-powered fluid pump, according to the illustrative embodiment of FIG. 6A.
Figure 6:
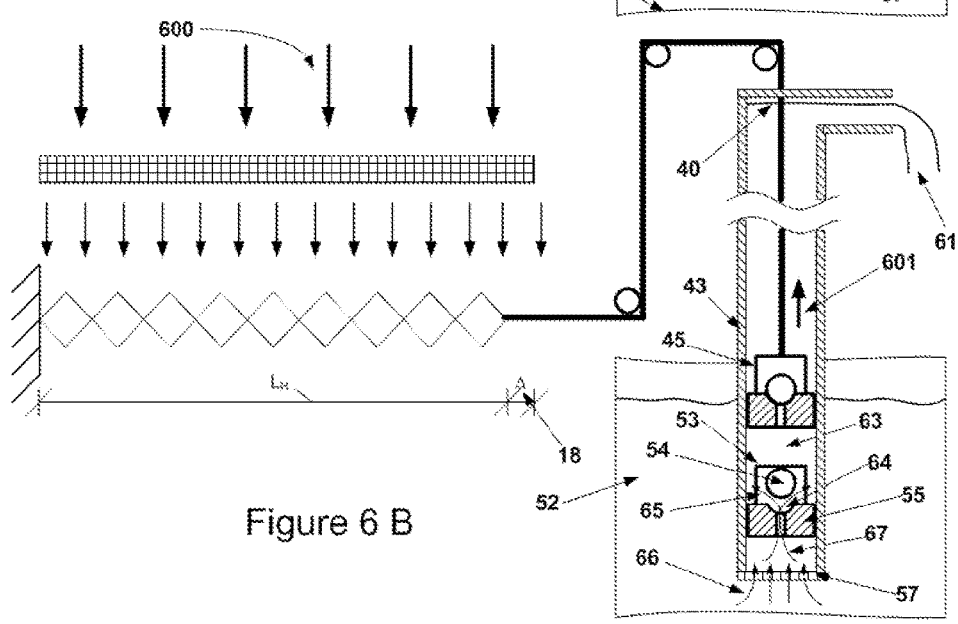
Figure 6:
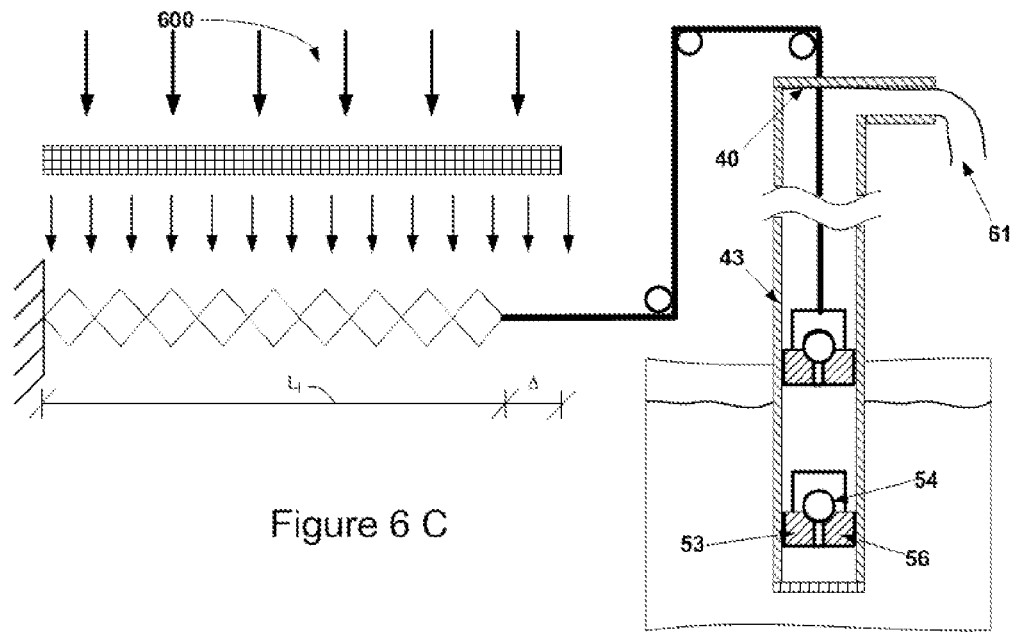
Figure 6:
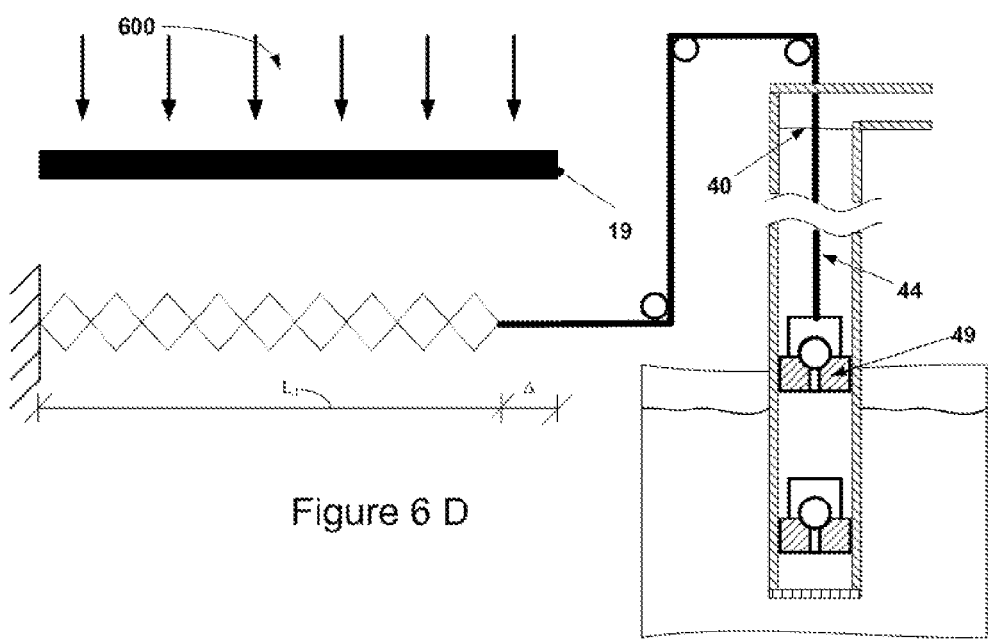
Figure 6:
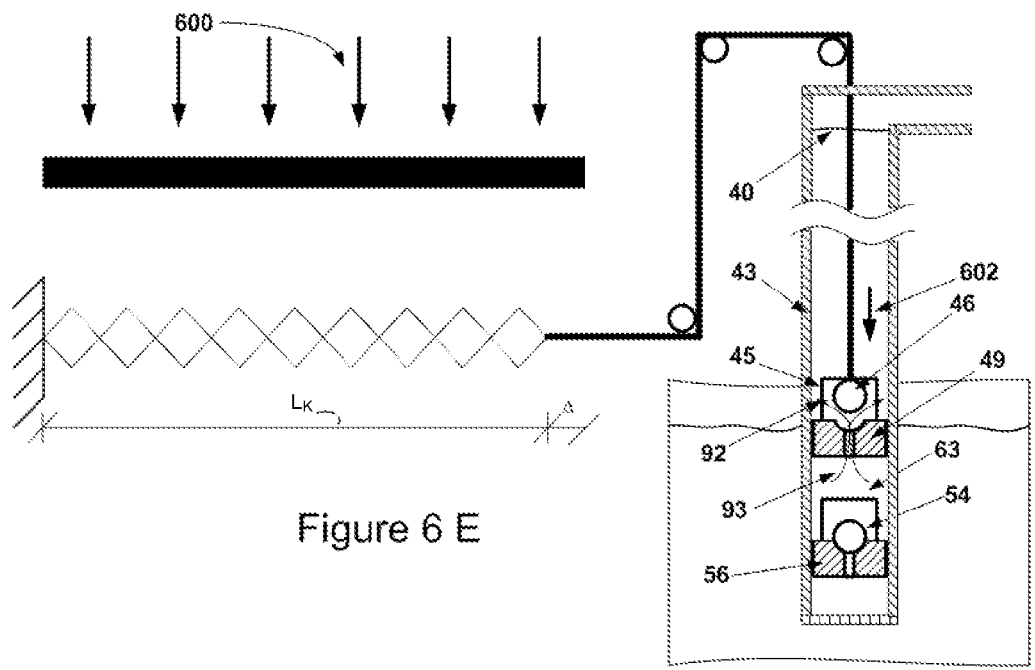
Figure 6:
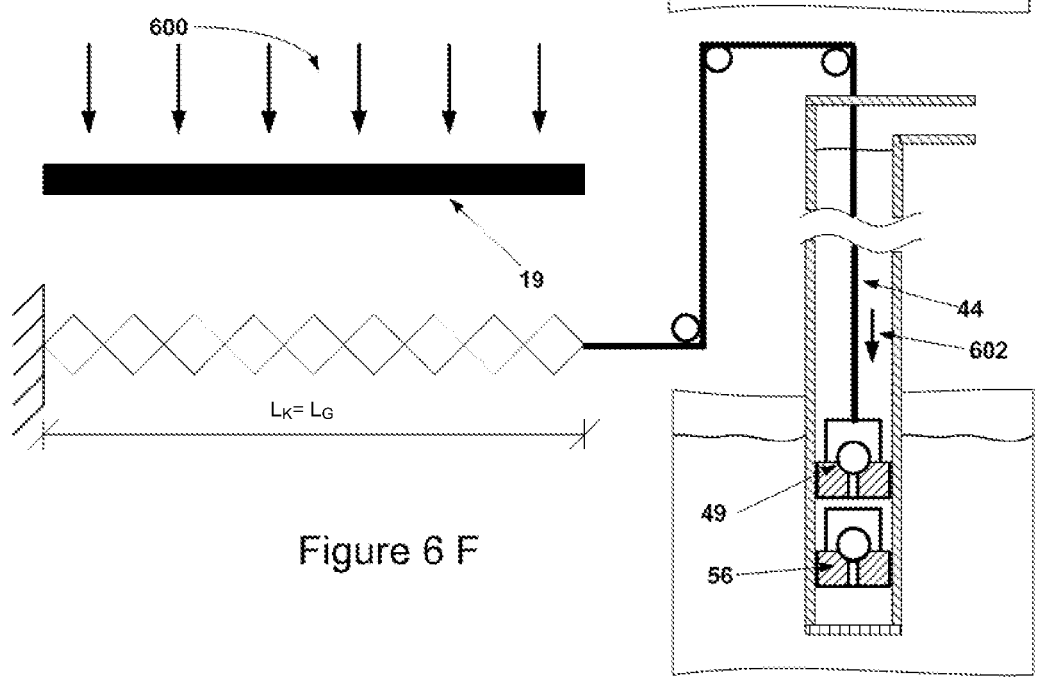

The illustrations in FIGS. 4, 5 and 6 indicate that the restoring force can come from a number of different sources and mechanisms. For instance, another SMA wire can be used in a so called antagonistic actuator. As one wire cools down and forms Martensite, an opposing wire will be heated and transition to Austenite. By timing the heating and cooling correctly, a minimal amount of energy from the wire transitioning into Austenite will be needed to strain the wire that is in Martensite. A linear spring is also not the only spring that is available for restoration. Bi-stable, leaf, coil and constant force springs can be used.

Figure 7:
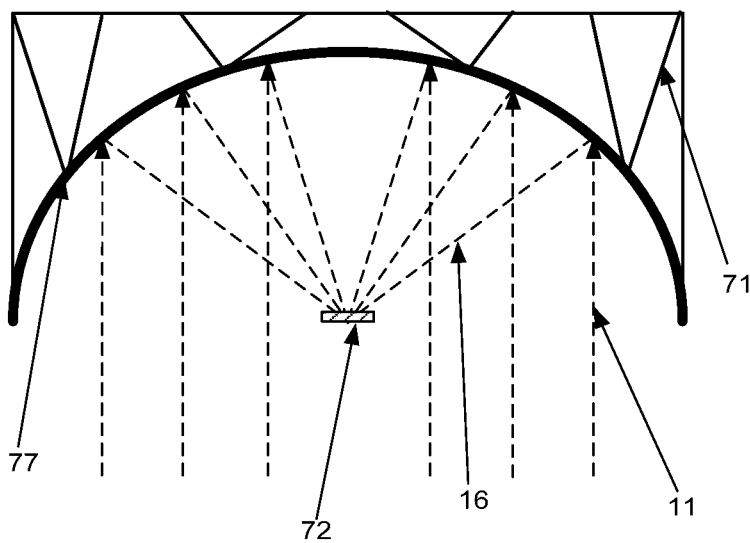
FIG. 7 is a schematic view that shows a reflective surface formed in the shape of a parabola for solar concentration for use with an exemplary energy harvesting system.

The device is not reliant on any one radiation concentrating mechanism. FIG. 7 shows a parabolic concentrator, FIG. 10 a convex lens and FIG. 11 a Fresnel lens. Other light and radiation concentrating methods such as holographic mirrors exist and will be well known to those skilled in the art. The illustrative embodiments herein contemplate the use of any component which serves to transmit, reflect, or otherwise manipulate radiation, or any subset of appropriate wavelengths, in order to cause the predetermined phase change in the SMA. Additionally, the illustrative embodiments described herein contemplate environments where sufficient heating of the SMA can be accomplished without the use of a solar concentrating mechanism. These environments can include those within Earth's atmosphere, or extra-terrestrial environments.

The parabolic concentrator of FIG. 7 takes parallel radiation waves 11 and deflects it off parabolic surface 77 to form concentrating ray 16. A parabolic concentrator has the unique characteristic that rays 16 converge to the focal point of the parabola. If an object 72, such as the SMA 13 of the invention is placed in the path of these concentrating rays, it will receive the equivalent of the ratio of the frontal length of the concentrator over the frontal area of the object 72 times the amount of radiation than when just placed in front of the radiation source. In this specific case, object 72 is illustrated as a type of SMA 13 namely a ribbon with a rectangular cross section.

There are many practical ways to construct parabolic concentrator 77 and the design tradeoff is usually lower cost versus higher efficiency. One way to make concentrator 77 is to form a reflective metal such as aluminum, silver, gold, nickel, etc. in the parabolic form and then polish the surface to increase its reflectivity. This curved metal is then attached to a super structure 71 to give it stiffness, help it being installed and prevent it from being deformed by the elements. These methods and materials are well known to those skilled in the art.

Figure 8:
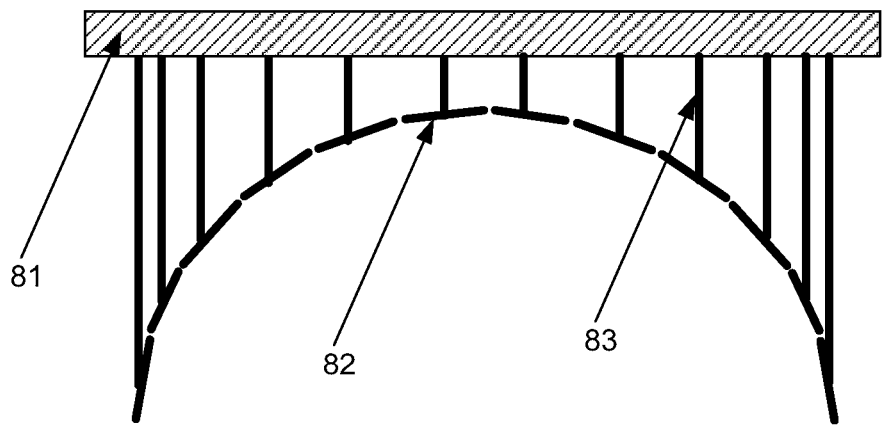
FIG. 8 is a schematic view of an alternative method for creating a parabolic concentrator with the use of a series of flat mirrors in an exemplary energy harvesting system.

Another method for producing a parabolic concentrator is to use a series of flat mirrors 82 as shown in FIG. 8. Here each individual mirror 82 is oriented so that the middle of the mirror points directly to the focal point of the parabola. Each mirror 82 is individually supported by a link 83 and connected to a base frame 81. The advantage of using multiple mirrors is that flat mirrors are less expensive to manufacture than curved mirrors. The disadvantage is that the ends of the mirrors 82 are not perfectly aligned with the focal point of the parabola and this increased losses of reflected light and radiation.

Figure 9:
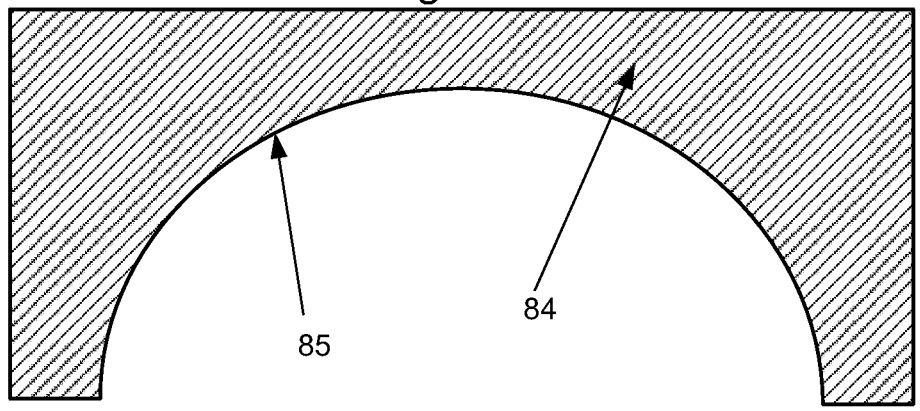
FIG. 9 is a schematic view of an extruded or injection molded parabolic that is covered with a reflective surface to form a radiation concentrator for use with an exemplary energy harvesting system.

Yet another method to manufacture parabolic reflectors is to extrude or injection mold a base shape such as 84 in FIG. 9 and then cover it with a reflective surface 85. The reflective surface can be a painted on, can be pre-made and attached or be a thin polished metal foil surface.

The above-mentioned methods for making a parabolic concentrator are well known to anyone skilled in the art. These are an example of currently used methods and are not the only methods available.

Figure 10:
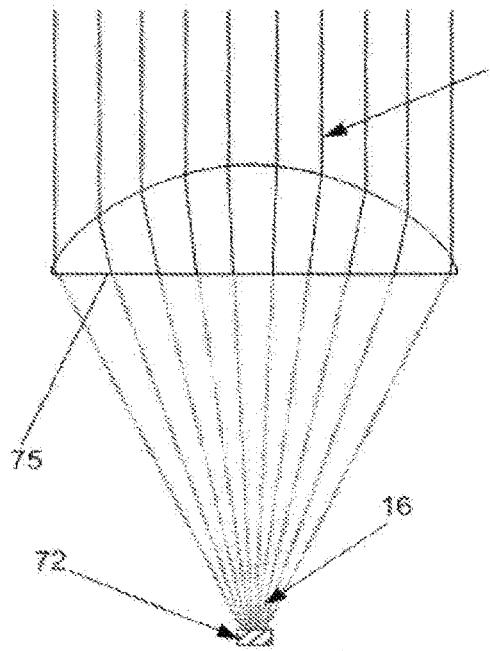
FIG. 10 is a schematic view showing the use of a transparent material formed into a concave lens for radiation concentration for use with an exemplary energy harvesting system.

The convex lens 75 in FIG. 10, deflects parallel radiation waves 11 as it travels through the medium. By designing the lens correctly, the rays will all be deflected to the same point, effectively concentrating the radiation 16. If rectangular cross section SMA object 72 is placed in the way of the concentrated rays 16, it will receive the amount of radiation equivalent to the frontal area of the lens.

Figure 11:
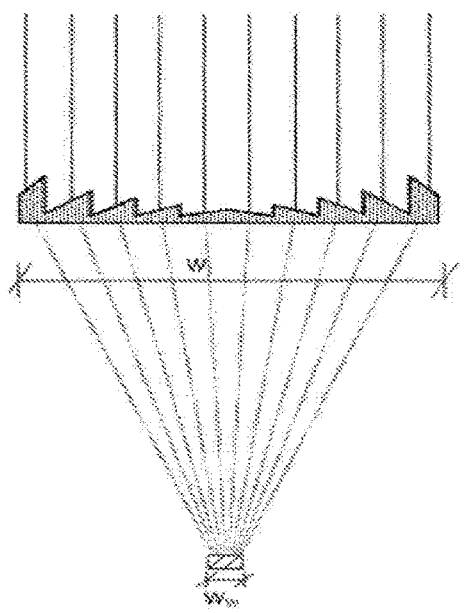
FIG. 11 is a schematic view of a Fresnel lens as a radiation concentrator for use with an exemplary energy harvesting system.

The Fresnel lens 70 shown in FIG. 11, works essentially the same as a convex lens except that it uses less material and is easier and less expensive to make. The technology of the Fresnel lens is described by way of example, in Fraas and O'Neil in U.S. Pat. Nos. 5,344,497 and 5,505,789. The Fresnel lens 70 deflects the parallel radiation 11 so that it gets concentrated 16 and focused on the object 72. Again the object receives the equivalent radiation of the frontal area of the lens. A Fresnel lens 70 can be made from many different materials such as glass, acrylic and other plastics. Machining, casting or extrusion of the base material can create the shape of the Fresnel lens 70. These processes are well known to those skilled in the art.

Figure 12:
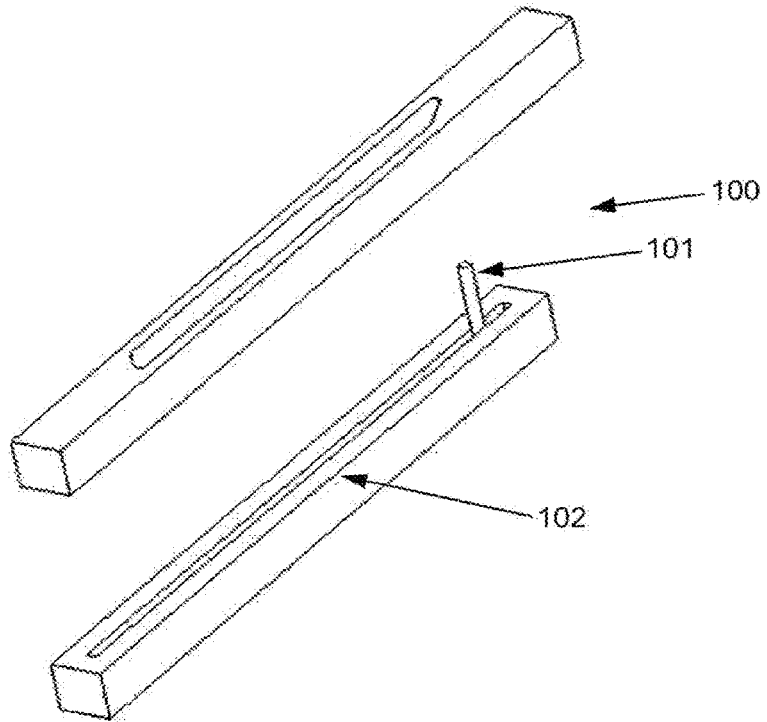
FIG. 12 is a perspective view of the components of a cam mechanism for using as the driver of a shading device for use with an exemplary energy harvesting system.
Figure 13:
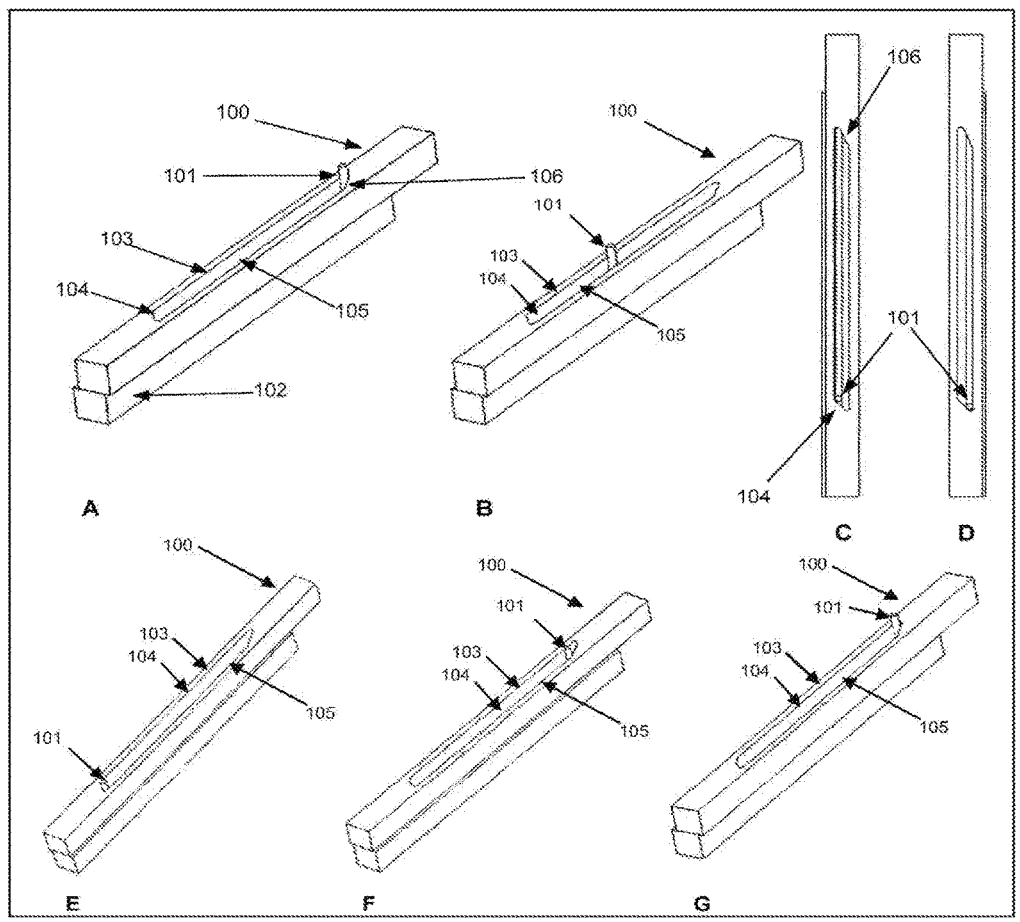
FIG. 13 is a perspective view demonstrating the working of a cam mechanism as the driver for a shading device for use with an exemplary energy harvesting system.

Shading system 19 of the device can take many forms and can be activated by many mechanisms. An exemplary mechanism is a cam driven linear translator as depicted in FIGS. 12 and 13. The pin and cam mechanism 100 is connected to the system that needs to be affected. In this case it will be the concentrating lens or focal lens 12. Guide 102 is connected to the base of the system and is fixed. Cam driver pin 101 is connected to SMA 13 and translates with end 14 of SMA 13.

FIG. 13 illustrates the integration and the working of the cam mechanism. Cam mechanism 100 is connected to guide 102 in such a manner that pin and cam mechanism 100 can only slide from side to side and not in the direction of the movement of pin 101. The four sides of cam mechanism 100 allows for pin 101 to move back and fourth while always being in contact with cam mechanism 100. When pin 101 is in position A, SMA 13 is cooled down, fully transformed into Martensite and extended. For solar applications this is the state that the system will be in the morning before the sun comes up. When the radiation 16 heats up SMA 13, it starts to contract and pin 101 is pulled down edge 103 as shown in FIGS. 13 B and C. Just before SMA 13 is fully contracted, pin 101 reaches edge 104. As pin 101 is further displaced, it pushes on edge 104 and forces pin and cam mechanism 100 to the left (Position D and E). This movement causes the shading system 19 to engage and block or remove concentrated radiation 16. Without radiation 16, SMA 13 cools down and contracts, causing pin 101 to slide up side 105 until it reaches side 106 (Position F). As SMA 13 is restrained further, pin 101 pushes cam mechanism 100 to the right and into position G. The movement of pin and cam mechanism 100 exposes SMA 13 to concentrated radiation 16 and the process repeats from A.

The device is not reliant on only a shading device 19 to remove the radiant heat from the sun. Additionally, the illustrative embodiments described herein contemplate the use of either active or passive cooling methods, e.g. heat sinks, fans, air convection, liquid cooling, or any other such mechanism that provides sufficient cooling so as to allow for SMA phase changes. As discussed above, concentrating devices 12 will be used to focus the radiation on the SMA 13. These devices include, but are not limited to holographic mirrors, parabolic mirrors, Fresnel lenses and other concentrating mirrors. When the heat needs to be removed, the mirrors can be moved or rotated so that they do not focus on the SMA any longer.

Figure 14:
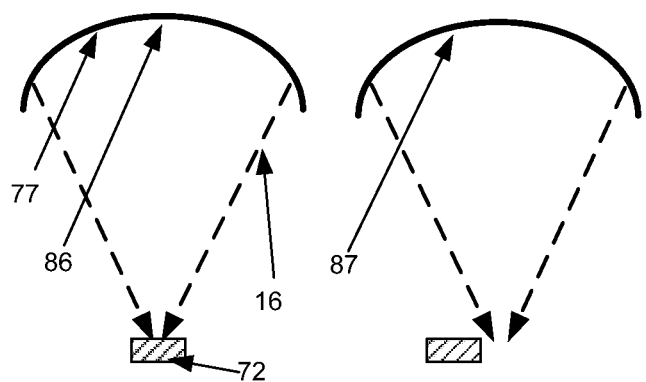
FIG. 14 is a schematic view of a parabolic concentrator will utilize the cam mechanism of FIG. 12 to create a shading device.

FIG. 14 shows how a parabolic concentrator surface 77, when in position 86 focuses rays 16 onto object 72. However, when surface 77 is translated with a device, similar to pin and cam mechanism 100, to a position 87, rays 16 are removed from object 72 and it will cool down.

Figure 15:
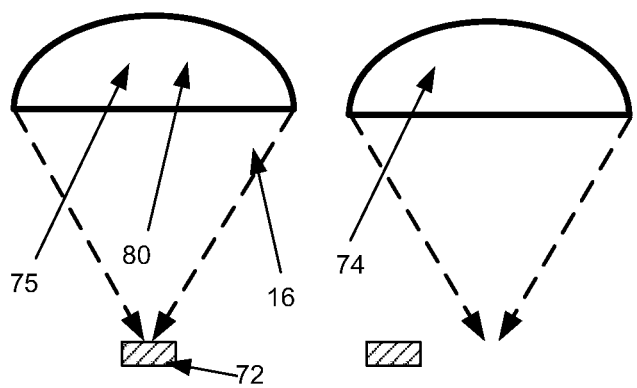
FIG. 15 is a schematic view of a concave lens will utilize the cam mechanism of FIG. 12 to create a shading device.
Figure 16:
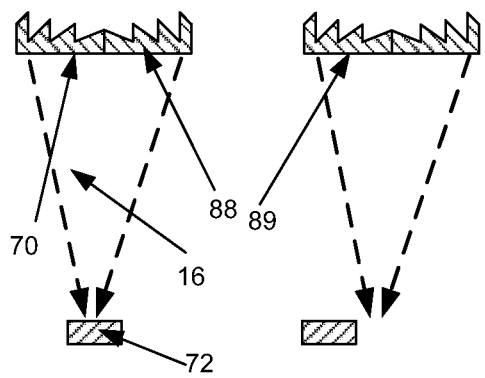
FIG. 16 is a schematic view of a Fresnel lens utilizing the cam mechanism of FIG. 12 to create a shading device.

FIGS. 15 and 16 illustrate how convex lens 75 and Fresnel lens 70, when moved from positions 80 and 88 to positions 74 and 89 by a mechanism such as a pin and cam mechanism 100, removes concentrated rays 16 from object 72, removing the heat source.

Figure 17:
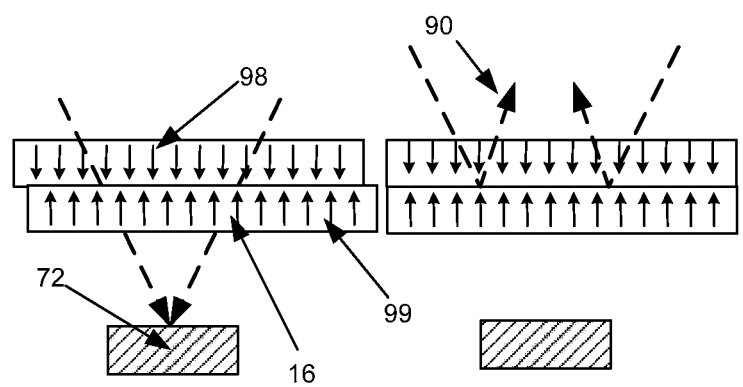
FIG. 17 is a schematic view of a pair of polarized lenses using the cam mechanism of FIG. 12 to create a shading device.

FIG. 17 illustrates another embodiment of the shading device. Here two polarized lenses 98 and 99 are situated on top of each other. In one position, the polarization of the lenses line up such that it allows concentrated rays 16 to pass through the system and onto object 72. However, when lenses 98 and 99 position with respect to each other is changed by a method such as pin and cam mechanism 100, the opposite optical polarity of the lenses will reflect rays 90 and effectively shade object 72.

Figure 18:
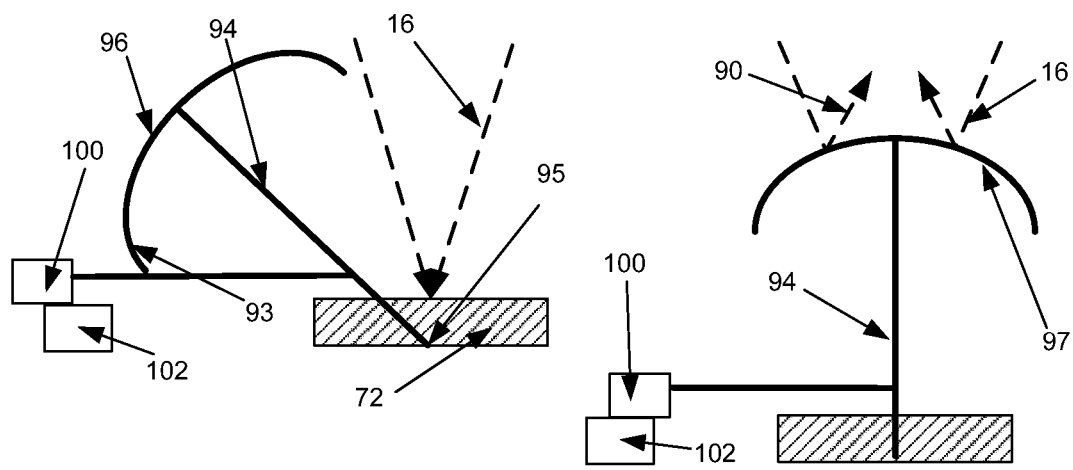
FIG. 18 is a schematic view of an opaque material being rotated by the cam mechanism of FIG. 12 in between the concentrated light and the SMA to create a shading device.

FIG. 18 illustrates how the linear motion of pin and cam mechanism 100 can easily be transformed into angular motion by means of a radial arm 94 around a pivot 95. This is a well-known method that can easily be implemented by anyone skilled in the art. When pin and cam mechanism 100 is in position A radial arm 94 is turned at an angle and reflective surface 96 is out of the way of concentrated rays 16. When pin and cam mechanism 100 is forced to position E, it pushes on and rotates radial arm 94 around pivot 95 so that reflective surface 96 is in a position between rays 16 and object 72, thus shading the object and removing the heat source.

FIG. 18 illustrates how the linear motion of cam mechanism 100 can easily be transformed into angular motion by means of a radial arm 94 around a pivot 95. This is a well-known method that can easily be implemented by anyone skilled in the art. When cam 100 is in position A radial arm 94 is turned at an angle and reflective surface 96 is out of the way of concentrated rays 16. When cam mechanism 100 is forced to position E, it pushes on and rotates radial arm 94 around pivot 95 so that reflective surface 96 is in a position between rays 16 and object 72, thus shading the object and removing the heat source.

Figure 19:
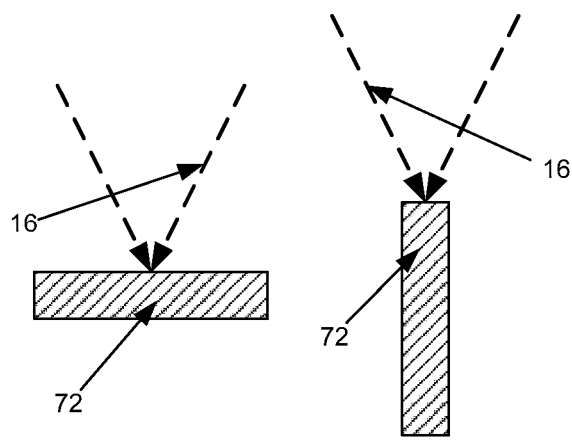
FIG. 19 is a schematic view of the SMA wire being rotated in order to turn the SMA on its side, reducing the radiation heat transfer to the SMA and thus creating a shading device.

Because object 72 has a rectangular cross section, one side is wider than the other. Since the amount of energy that is transferred to the object is directly related to the surface area of the object exposed to the radiation, it is possible to increase or decrease energy transfer by orienting the object. On the left of FIG. 19, object 72 is in a position where a wider edge is exposed to concentrated rays 16. This increased the heat transfer to the object. When the object is hot, an exemplary rotating mechanism such as the one described in FIG. 18 will rotate object 72 to a position where the thinner part of object 72 is exposed to rays 16. This reduces the energy transfer to object 72 and allows it to cool, effectively shading the object 72.

Figure 20:
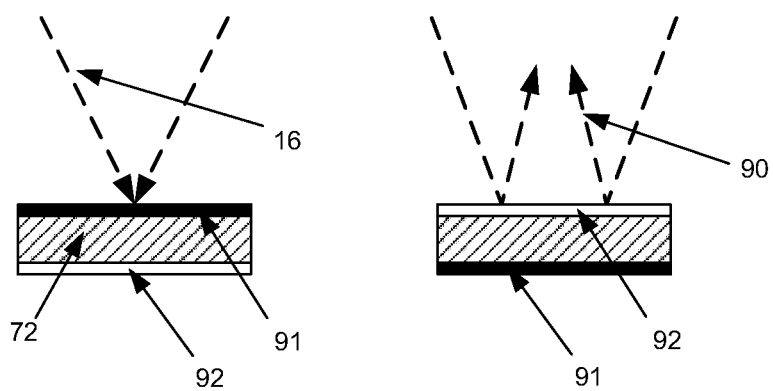
FIG. 20 is a schematic view illustrating the use of radiant absorbent and reflective materials for the use as a shading device.

In another embodiment of shading device 19 one side of object 72 can be covered in a highly light absorbent material 91 and the other side in a highly reflective material 92 as shown in FIG. 20. By moving the absorbent material 91 into the solar radiation by means of a rotating mechanism such as illustrated in FIG. 18, the SMA will be heated and conversely, by moving the reflective material into the solar radiation path, the radiation will be reflected, essentially creating a shading device 19.

The shading mechanisms described in FIGS. 14, 15 and 16, removes radiation 16 away from object 72 and transmits the energy, as waste, into the environment. If the device can be constructed in such a manner that the radiation 16, when not applied to object 72 and allowing it to cool down, is applied to another object, the efficiency of the entire system can be increased since one object will do work while the other is cooling down.

Figure 21:
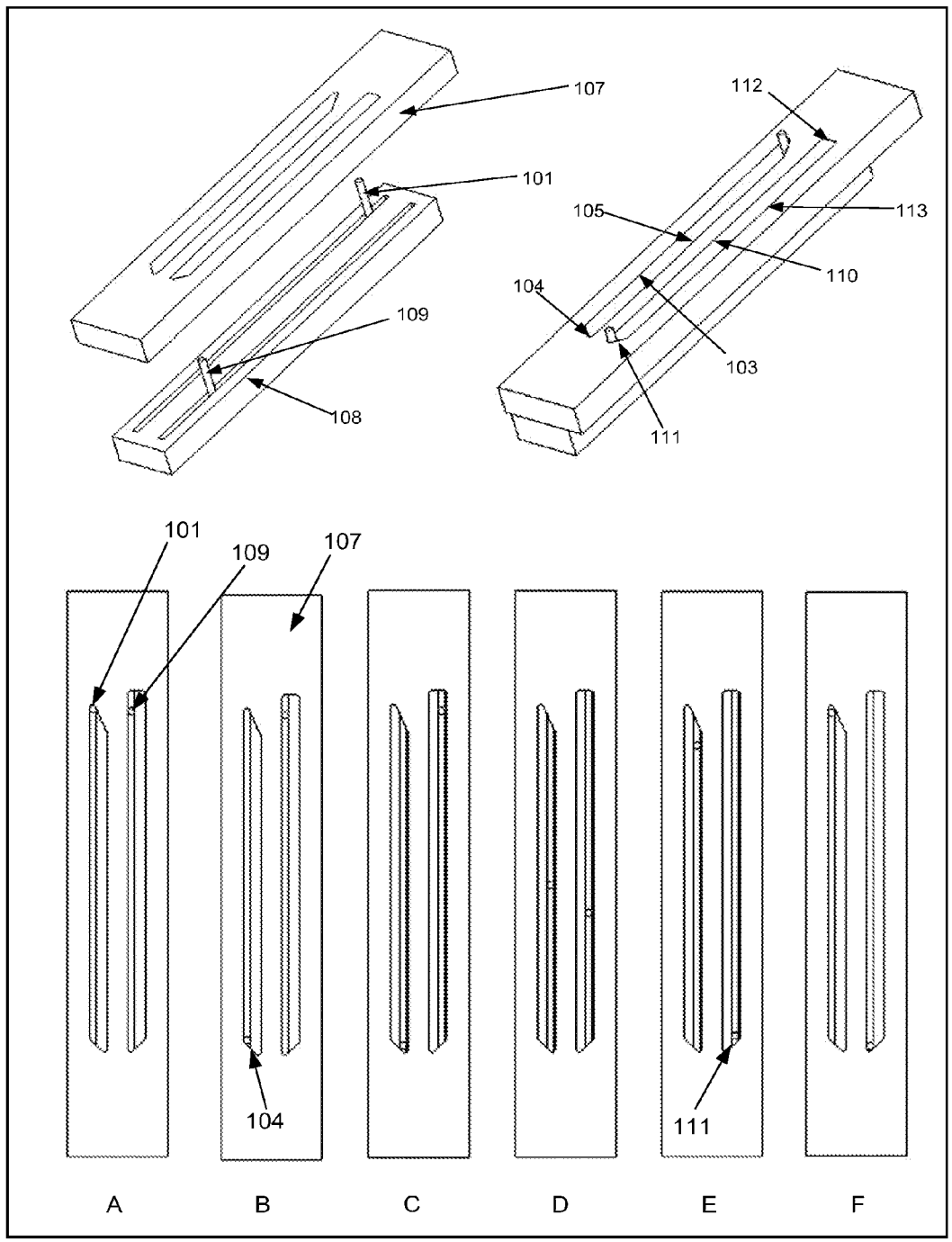
FIG. 21 is a schematic view demonstrating the components and working of a dual cam mechanism that doubles the efficiency of the system by moving the concentrated sunlight from one SMA wire to another, thereby shading one and allowing it to cool while heating another.

For such an increased efficiency scheme to work, a modified version of the cam mechanism 100 is needed. FIG. 21 illustrates one possible implementation of a dual cam mechanism 107. Here the system consists of ay dual cam mechanism 107, pins 101 and 109 connected to two individual SMA wires 13 and a base 108 that is stationary. Again, the dual cam mechanism 107 is attached to base 108 in such a ways that it is allowed to slide perpendicular to pins 101 and 109 direction of travel.

The left cam of the dual cam mechanism 107 is exactly the same as cam mechanism 100. The dual cam mechanism 107 has an additional cam surfaces for pin 109 to slide on. The dual cam mechanism 107 works as follow: When in rest, both SMA wires connected to pins 101 and 109 are in the Martensite phase and full extended as shown in A of FIG. 21. The dual cam mechanism 107 is all the way to the right so that SMA 13 connected to pin 101 will be exposed to radiation 16 first. When radiation 16 heats up the SMA 13, pin 101 slides down surface 103 until it reaches surface 104. Further heating of the SMA 13 pushes pin 101 onto surface 104 and thus forces dual cam mechanism 107 over to the left and pin 109 onto surface 113 as shown in C of FIG. 21. Because the dual cam mechanism 107 is coupled to shading device 19, this movement will first remove the radiation 16 from the SMA 13 connected to pin 101 and second, expose the SMA 13 connected to pin 109 to that same radiation 16. The addition of radiation to SMA 13 connected to pin 109 will heat it up and it will contract, thus moving pin 109 down side 113. At the same time SMA 13 connected to pin 101 will cool and pin 101 will slide up surface 105 (D in FIG. 21). Depending on the specific characteristics of SMA 13, pin 101 will be at some position along surface 105 when the pin 109 reaches the surface 111 (E in FIG. 21). Pin 109 will move further downward, pushing on cam surface 111 and forcing the dual cam mechanism 107 over to the right as shown in F of FIG. 21. At this stage the radiation 16 is removed from SMA 13 connected to pin 109 and transferred to SMA 13 connected to pin 111. Pin 109 will thus start to move up surface 110 while pin 101 moves down surface 103, and the process will repeat.

Figure 22:
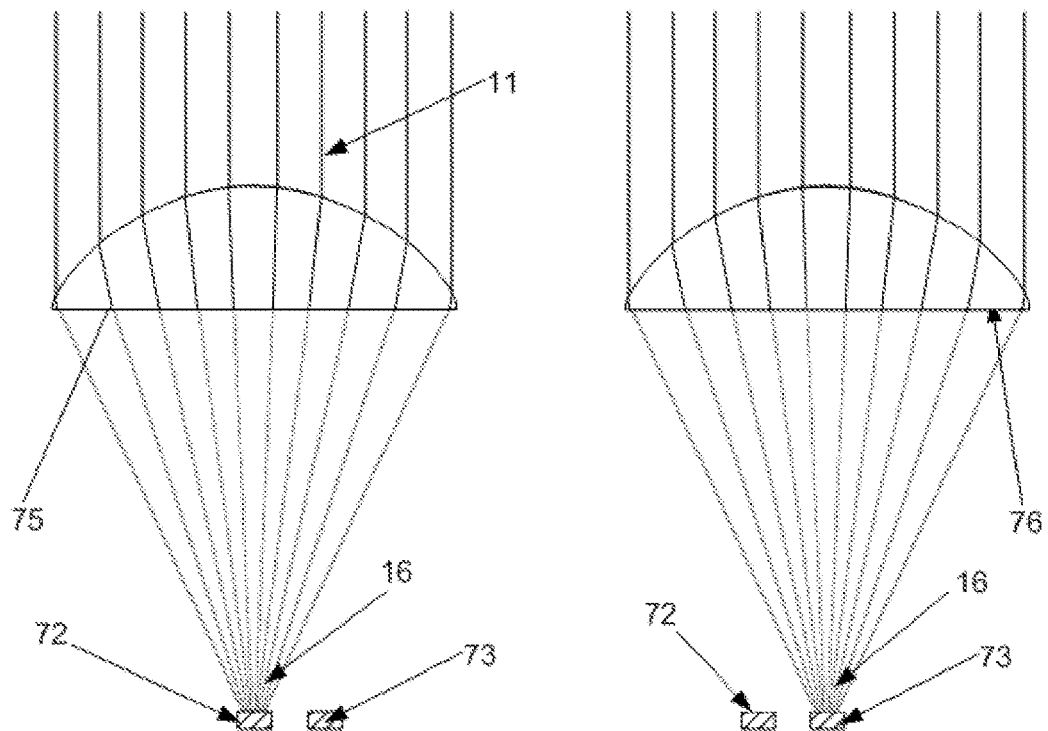
FIG. 22 is a schematic view of the linear translation of the dual cam mechanism of FIG. 21 utilized with a concentrating lens.

FIG. 22 illustrates the effect of the dual mechanism on the two SMA 13 wires, objects 72 and 73. When in position A of FIG. 21, convex lens 75 will concentrate radiation 16 onto object 72 and heat it up. When dual cam mechanisms 107, connected to convex lens 75, is translated to position C in FIG. 21, convex lens 75 will be forced into position 76 and thus remove concentrated rays 16 from object 72 and onto 73. Object 73 will heat up until dual cam mechanism 107 is translated with lens 73 and the rays moved onto object 72 again.

Figure 23:
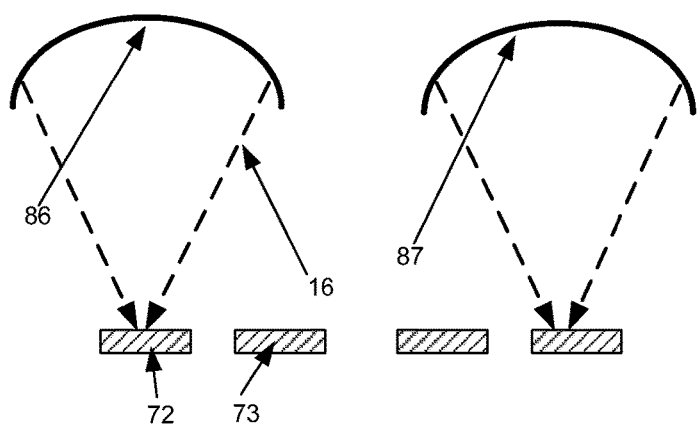
FIG. 23 is a schematic view of the linear translation of the dual cam mechanism of FIG. 21 utilized with a parabolic concentrator.
Figure 24:
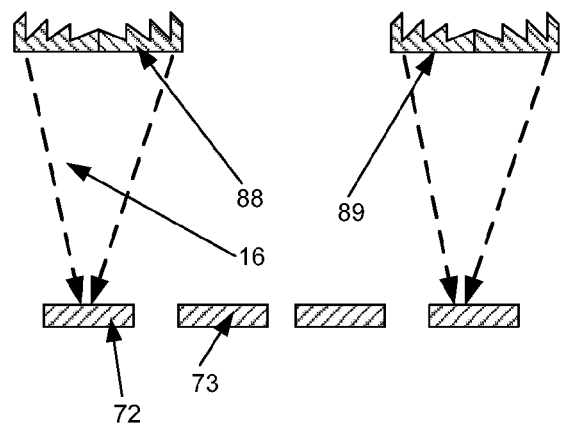
FIG. 24 is a schematic view of the linear translation of the dual cam mechanism of FIG. 21 utilized with a Fresnel lens.

FIGS. 23 and 24 illustrates the same concept of FIG. 22, but this time with parabolic concentrator 86 being moved to position 87 and Fresnel lens 88 being moved to position 89 to transfer radiation 16 from object 72 to object 73.

Figure 25:
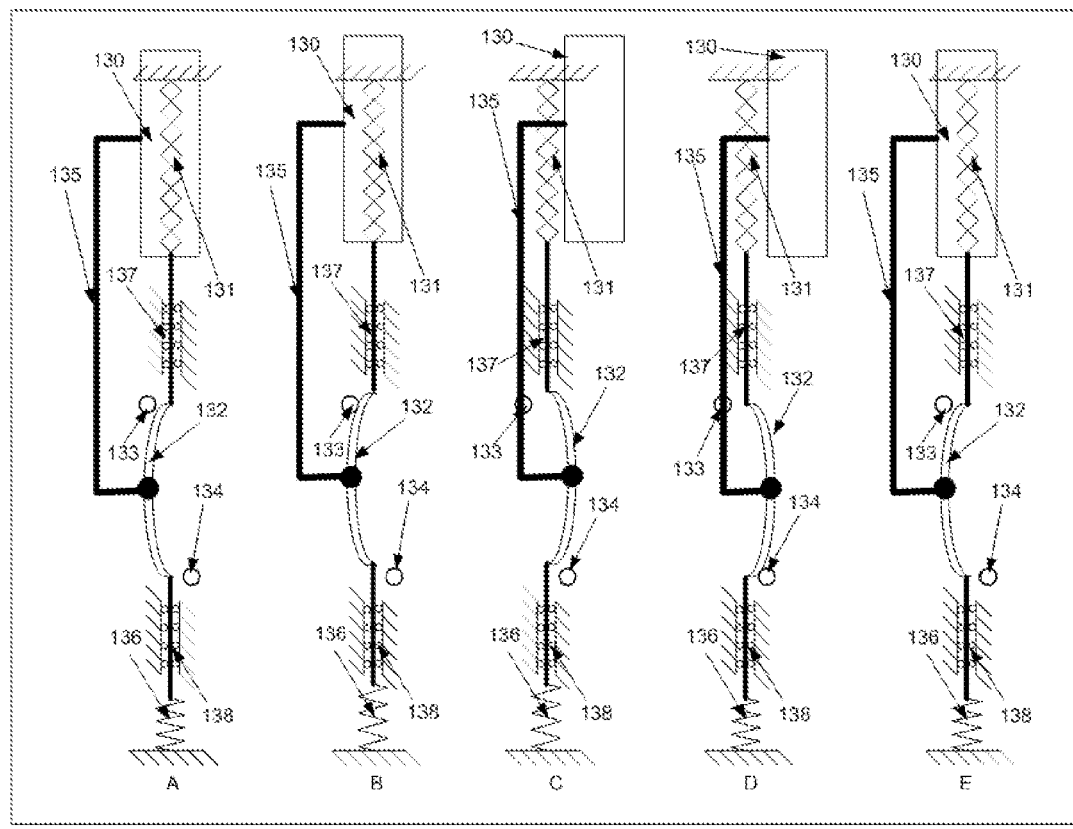
FIG. 25 is a schematic view of a bi-stable spring mechanism as the driver for a shading device.

In another embodiment of the invention, the shading mechanism is implemented by means of a bi-stable spring as described in FIG. 25. In FIG. 25A concentrating leans 12 is in a position so that when it is exposed to radiation, it will heat SMA 13. SMA 13 is coupled to an upper linear bearing 137 that is coupled to a bi-stable spring 132. A bi-stable spring is an ubiquitous device that is used in many applications and will be well known to those skilled in the art. Bi-stable spring 132 is also connected to lower linear bearing 138 which is attached to restoring spring 17. Bi-stable spring 132 is further connected to concentrating lens 12 via link 135. In this configuration, lens 12 will follow all movements of bi-stable spring 132.

When the mechanism is in the position depicted by FIG. 25A, the concentrating lens 12 is exposed to sunlight and aligned with SMA 13 such that SMA 13 will heat up. As the temperature of SMA 13 increases, it contracts by means as described above, thereby displacing upper linear bearing 137, bi-stable spring 132, lower linear bearing 138 and the tip of restoring spring 17.

The displacement of the system will continue until bi-stable spring 132 comes into contact with upper contact pin 133 as illustrated in FIG. 25B. As SMA 13 contracts more, it will force bi-stable spring 132 into upper contact pin 133 so that the convex surface of bi-stable spring 132 is displaced perpendicular to the direction of movement of the linear bearings, in the direction of its concave surface.

The nature of a bi-stable spring is such that there exists a point where, if the convex surface of the spring is pushed beyond that point in the direction of the concave surface, that the spring will relive its internal energy by rapidly transforming its convex surface into a concave surface, and vice-versa.

In FIG. 25C, the transformation point of bi-stable spring 132 was reached and the bi-stable spring 132 has released its internal energy by altering its shape as shown. Due to link 135, the movement of bi-stable spring 132 causes concentrating lens 12 to be displaced as shown. This displacement moves the concentrated radiation off of the SMA 13, thereby allowing it to cool.

As SMA 13 cools, it is transformed into Martensite, as set forth above. This transformation allows restoring spring 17, which has been extended due to the displacement of SMA 13, to re-strain SMA 13. As SMA 13 is extended, linear bearings 137 and 138 moves bi-stable spring 132 in the direction of the spring as shown in FIG. 25D until the convex surface of bi-stable spring 132 comes into contact with lower contact pin 134. As SMA 13 relaxes more, restoring spring 17 is able to displace bi-stable spring against lower contact pin 134, forcing the convex surface toward the concave surface until bi-stable spring relieves its internal elegy and transforms its convex surface into a concave surface and its concave surface into a convex surface as shown in FIG. 25E. At this stage the transformation of bi-stable spring 132 has also cause lens 12 to move back over SMA 12 via link 135. This allows radiation to once again heat SMA 13 and the process repeats itself as the system is now in a similar state as shown in FIG. 25A.

The above illustrates yet another method for utilizing the linear displacement of SMA 13 to manipulate a light concentrating device of the types described above in order to electively heat and cool the SMA 13 and thus derive useful work from it.

In yet another embodiment of the invention, the linear motion of the SMA is transformed into a rotary motion. This transformation can be accomplished by numerous mechanisms that will be obvious to those skilled in the art. When rotary motion is being utilized, the activating and shading mechanism of FIG. 26 can be utilized. This top view of a the mechanism shows several concentrating lenses 12 radially connected to disk 122 with SMAs 13 rigidly attached to each lens 12 as shown. The top of the mechanism is divided into a clear cover 120 and a shaded cover 121 that allows and reflects radiation respectively. Disk 122 is allowed to rotate with respect to covers 120 and 122 such that lenses 12 are free to move underneath said covers. Disk 122 is connected to a shaft 124 that is driven by the transformation of SMAs 13's linear motion into rotary motion by means of a device, thus termed overall a "rotary device" 127, that will be known to those skilled in the art.

Figure 26:
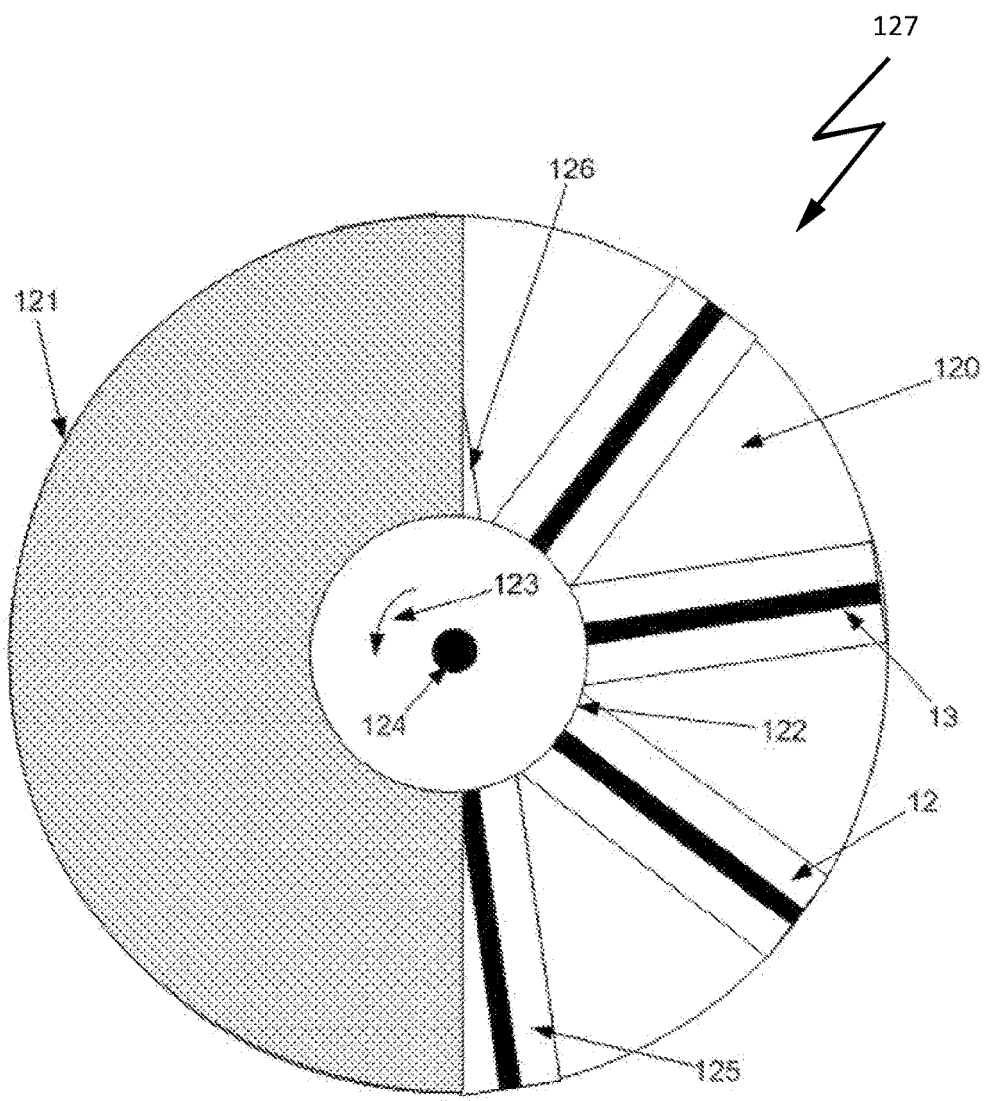
FIG. 26 is a schematic view of a rotating mechanism is incorporated as a shading device.

When disk 122 is rotating in direction 123 as shown in FIG. 26, lens 125 will become exposed to radiation as it rotates into clear cover 120 and lens 126 will be going under shaded cover 121. The SMA 13 that is connected to lens 125 will be exposed to concentrated radiation and will heat up, contract and deliver mechanical power to the device that is rotating the entire system. Lens 126 will be rotated underneath shaded cover 121 and therefore the radiation on the SMA connected to it will disappear, thereby allowing the SMA to cool, expand and be ready to contract when rotated into radiation again.

The mechanism for translation, rotation and shielding of lenses, concentrators, and surfaces to achieve shading and shifting of radiation to and from SMA 13 is not limited to the devices described above. These merely serve as an indication of what is possible and it is anticipated that anyone skilled in the art can produce different mechanisms to achieve the same goal namely to oscillate radiation heat transfer to and from a SMA 13.

Regardless of the embodiment, the amount of power delivered by the actuation system is given by the following relation:

$$P = A_w \rho_{Max} \epsilon_{Max} l_w f \quad (1)$$

Where P is the power, $A_w$ die frontal area of the SMA wire or ribbon, $\sigma_{Max}$ the maximum stress in the wire, $\epsilon_{Max}$ the maximum strain of the wire, $l_w$ the length of the wire and f the frequency of operation, i.e. the amount of cycles that the actuator completes per second. The maximum stress and strain is a function of the material properties and are usually governed by fatigue properties and other life time operational issues. In order to increase the power delivered by the system, one can increase the frontal area of the actuator, the length of the actuator and the frequency of operation. These are, however, conflicting requirements in the sense that a larger area and length will increase the mass of the system and thus the thermal inertia which will adversely affect the frequency of operation since it will take longer to heat and cool the actuator. It is thus an object of the invention to obtain an optimal combination of the parameters of equation 1 in order to produce the maximum amount of power.

It is desirable to find the most attractive combination of wire parameters to deliver the maximum amount of mechanical energy when heated. This optimization will trade off wire frontal area, wire perimeter, wire shape, material hysteresis, material $A_f$ temperature, material $M_f$ temperature, material emissivity, material maximum stress, material maximum strain, material restoring stress, material thermal conductivity and other relevant properties. It is desirable to obtain the highest amount of energy for the least amount of production cost. For instance, individual wires with shading mechanisms and power generating mechanism at one extreme might not deliver the same amount of energy per unit cost as an array of wires that use one shading mechanism and one energy conversion mechanism. Also, one continuous wire that is rolled around a bearing mechanism will provide more stroke but less force than many wires in an array. These tradeoffs will allow for design optimization of energy conversion and production cost.

According to a further alternate embodiment, it is expressly contemplated that the SMA can be placed in thermal communication with a heat sink and/or another mechanism (for example, a working fluid, such as air) that facilitates more rapid and more efficient heating and cooling of the SMA, so as to increase its efficiency and/or cycle rate. For example, an impeller that flows environmental air over the SMA can be engaged during each cooling cycle.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, the materials used in the connector may vary in elasticity. Likewise, the materials and structure of the concentrating lenses may vary in arrangement. Likewise, the shape and sizes of SMAs, the composition of SMA and/or their cycle rate are all highly variable. Likewise, a plurality of dual cam mechanisms can be employed, allowing for greater power output. In addition, the return spring can be constructed of a variety of materials, in a number of configurations. For example, a repelling magnetic return spring or a gas cylinder spring can be used in alternate embodiments. Likewise, the shape and size of the house for the overall device, or portions thereof, can be constructed from a variety of materials with a range of three-dimensional geometries. Accordingly, this description is meant to be taken only by way of example, and not to otherwise limit the scope of this invention.

What is claimed is:

1. A system for generating mechanical power comprising:
a radiation concentrator;
a memory metal component comprising at least one of a wire and a ribbon and having a length oriented along a first axis, the memory metal component being selectively exposed along the length to direct concentrated radiation through the radiation concentrator, the memory metal component being constructed and arranged to experience a first phase change from a first phase to a second phase based upon a first change in temperature resulting from the selective radiation exposure so as to exert a first predetermined force in a first direction along the first axis causing the memory metal component to create a tension force along the first axis;
a recovery element connected to the memory metal component that exerts a second predetermined force in a second direction along the first axis that is opposed to the first direction; and
a drive member operatively connected to the memory metal component that performs work in response to the first predetermined force in each cycle from the first phase to the second phase and back to the first phase, wherein the work performed over time is maximized by optimizing a frontal area of the at least one of the wire or the ribbon, a maximum stress in the at least one of the wire or the ribbon, a maximum strain of the at least one of the wire or the ribbon, the length of the at least one wire or the ribbon, and the frequency of the cycles.

2. The system as set forth in claim 1, wherein the recovery element is further defined as a return spring.

3. The system as set forth in claim 1, wherein the radiation concentrator comprises at least one of a parabolic concentrator, a convex lens, or a Fresnel lens.

4. The system as set forth in claim 1 further comprising: a shading system constructed and arranged to at least partially obscure the radiation so as to cause a second phase change from the second phase to the first phase in response to a second change in temperature that occurs, at least in part, due to the partially obscured radiation.

5. The system as set forth in claim 4, wherein the shading system further comprises a pin and cam mechanism.

6. The system as set forth in claim 4, wherein the radiation concentrator of the shading system is selectively adjustable between a first orientation and a second orientation.

7. The system as set forth in claim 1, wherein the memory metal component is a Shape Memory Alloy comprising Nickel and Titanium.

8. The system as set forth in claim 7, wherein the memory metal component further comprises Copper.

9. The system as set forth in claim 1, wherein the drive member is constructed and arranged to drive a linear reciprocal device.

10. The system as set forth in claim 9, wherein the work is performed by moving a magnet and a coil with respect to each other in order to produce an electric current.

11. The system as set forth in claim 9, further comprising a double one-way valve linear pump constructed and arranged to increased pressure and cause flow of a liquid.

12. The system as set forth in claim 11, wherein the liquid comprises at least one of water, oil, or gasoline.

13. The system as set forth in claim 1, further comprising a linear compressor operatively connected to the drive member, the linear compressor constructed and arranged to compress a gas.

14. The system as set forth in claim 13, wherein the compressor is operatively connected to an air-conditioning device.

15. The system as set forth in claim 1, wherein the drive member is operatively connected to a rotary device, and the drive member is constructed and arranged to create rotational motion and deliver energy to the rotational device.

16. The system as set forth in claim 1, further comprising a rotary electromagnetic generator operatively connected thereto, so as to generate electricity, compress a working fluid through a rotary compressor, and pump the fluid through a rotary vein pump.

17. A method of generating mechanical power, comprising the steps of:

providing a radiation concentrator;

selectively exposing a memory metal component comprising at least one of a wire and a ribbon and having a length oriented along a first axis to direct concentrated radiation through the radiation concentrator;

causing the memory metal component to experience a first phase change from a first phase to a second phase based upon a first change in temperature resulting from the selective radiation exposure along the length;

exerting a first predetermined force in a first direction along the first axis based on the first phase change causing the memory metal component to create a first tension force along the first axis;

exerting a second predetermined force in a second direction along the first axis that is opposed to the first direction;

selectively operating a shading system so as to at least partially obscure the radiation; and causing the memory metal component to experience a second phase change from the second phase to the first phase based upon the selective operation of the shading system, whereby a drive member operatively connected to the memory metal component performs work in response to at least one of the first and second predetermined forces in each cycle from the first phase to the second phase and back to the first phase, wherein the work over time is maximized by optimizing a frontal area of the at least one of the wire or the ribbon, a maximum stress in the at least one of the wire or the ribbon, a maximum strain of the at least one of the wire or the ribbon, the length of the at least one wire or the ribbon, and the frequency of the cycles.

18. The method as set forth in claim 17, wherein the selective exposing step further comprises:

concentrating the radiation on the memory metal component by employing the radiation concentrator, which comprises any one of a parabolic concentrator, a convex lens, or a Fresnel lens.

19. The method as set forth in claim 17, wherein the first phase change causes the selective operation of the shading system.

20. The system as set forth in claim 1, wherein the shape memory component comprises the ribbon defining a substantially rectangular cross section.

\* \* \* \* \*